(12) United States Patent
Sheppard et al.

(10) Patent No.: US 9,936,255 B2
(45) Date of Patent: Apr. 3, 2018

(54) METHODS AND APPARATUS TO DETERMINE CHARACTERISTICS OF MEDIA AUDIENCES

(71) Applicant: The Nielsen Company (US), LLC, New York, NY (US)

(72) Inventors: Michael Sheppard, Brooklyn, NY (US); Peter Lipa, Tucson, AZ (US); Jonathan Sullivan, Hurricane, UT (US); Alejandro Terrazas, Santa Cruz, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 14/921,911

(22) Filed: Oct. 23, 2015

(65) Prior Publication Data
US 2017/0118517 A1   Apr. 27, 2017

(51) Int. Cl.
*H04H 60/33* (2008.01)
*H04N 21/466* (2011.01)
*H04N 21/442* (2011.01)
*H04N 21/25* (2011.01)
*H04N 21/258* (2011.01)
(Continued)

(52) U.S. Cl.
CPC ........ *H04N 21/4663* (2013.01); *H04H 60/45* (2013.01); *H04N 21/251* (2013.01); *H04N 21/252* (2013.01); *H04N 21/25883* (2013.01); *H04N 21/25891* (2013.01); *H04N 21/44222* (2013.01); *H04N 21/4667* (2013.01); *H04N 21/6582* (2013.01)

(58) Field of Classification Search
CPC .................................................. H04N 21/4663
USPC .............................................................. 725/9
See application file for complete search history.

(56) References Cited

U.S. PATENT DOCUMENTS

| 5,481,294 A | 1/1996 | Thomas et al. |
| 6,950,844 B2 | 9/2005 | Walster et al. |

(Continued)

OTHER PUBLICATIONS

Decision Tree, "Decision Tree—Classification", [http://www.saedsayad.com/decision_tree.htm], retrieved on Sep. 18, 2015, (4 pages).

(Continued)

*Primary Examiner* — Michael Hong
(74) *Attorney, Agent, or Firm* — Hanley, Flight and Zimmerman, LLC

(57) ABSTRACT

Methods and apparatus to determine characteristics of media audiences are disclosed. An example method includes creating a constraint matrix based on a first activity associated with a first characteristic of a population, the first activity associated with a second characteristic of the population, and a first combination associated with at least one of the first activity, the first characteristic, and the second characteristic. The example method includes creating a combination total set based on a first measurement for the first activity associated with the first characteristic and a second measurement for the first activity associated with the second characteristic. The example method includes computing a first entropy probability based on the constraint matrix and the combination total set. The example method includes estimating a first portion of the population that matches the first combination based on the first entropy probability.

46 Claims, 8 Drawing Sheets

(51) Int. Cl.
*H04H 60/45* (2008.01)
*H04N 21/658* (2011.01)

(56) References Cited

U.S. PATENT DOCUMENTS

| | | |
|---|---|---|
| 7,954,120 B2 | 5/2011 | Roberts et al. |
| 8,112,301 B2 | 2/2012 | Harvey et al. |
| 8,346,593 B2 | 1/2013 | Fanelli et al. |
| 8,543,523 B1 | 9/2013 | Palit et al. |
| 8,572,019 B2 | 10/2013 | Eggers et al. |
| 8,739,197 B1 | 5/2014 | Pecjak et al. |
| 8,898,689 B2 | 11/2014 | Georgakis |
| 8,984,547 B2 | 3/2015 | Lambert et al. |
| 2003/0130887 A1 | 7/2003 | Nathaniel |
| 2008/0300965 A1 | 12/2008 | Doe |
| 2009/0187520 A1 | 7/2009 | Liu et al. |
| 2013/0197975 A1 | 8/2013 | Miller et al. |
| 2014/0122703 A1 | 5/2014 | Pugh et al. |
| 2014/0188554 A1 | 7/2014 | Harter et al. |
| 2015/0356056 A1* | 12/2015 | Matteson ................ G06F 17/16 708/607 |

OTHER PUBLICATIONS

Oikonomou et al., "Explicit Bounds for Entropy Concentration under Linear Constraints", Sep. 23, 2014, (51 pages).

Hong et al., "Maximum-Entropy Expectation-Maximization Algorithm for Image Reconstruction and Sensor Field Estimation" IEEE Transactions on Image Processing, vol. 17, No. 6, Jun. 2008, (11 pages).

S.N. Wood, "Modelling and smoothing parameter estimation with multiple quadratic penalties", Journal of the Royal Statistical Society, Series B (Statistical Methodology), 62 (2). pp. 413-428 (2000), [http://dx.doi.org/10.1111/1467-9868.00240], (18 pages).

Massoud Malek, "Nonlinear Systems of Ordinary Differential Equations", [http://www.mcs.csueastbay.edu/~malek/Class/nonlinear.pdf], retrieved on Mar. 11, 2015 (8 pages).

* cited by examiner

US 9,936,255 B2

METHODS AND APPARATUS TO DETERMINE CHARACTERISTICS OF MEDIA AUDIENCES

FIELD OF THE DISCLOSURE

This disclosure relates generally to audience measurement, and, more particularly, to predicting characteristics of media audiences.

BACKGROUND

Traditionally, audience measurement entities enlist panelist households to participate in measurement panels. Members of the panelist households provide demographics data (e.g., gender and age) to the audience measurement entities and allow the audience measurement entities to collect data of media exposure (e.g., exposure to television programming, advertising, movies, etc.) of the panelist household members. To collect the media exposure data of the panelist household members, some audience measurement entities employ meters (e.g., people meters) that monitor media presentation devices (e.g., televisions) of the panelist household. In some instances, the audience measurement entities estimate exposure metrics for media based on the demographics data and the media exposure data collected from the panelist households.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
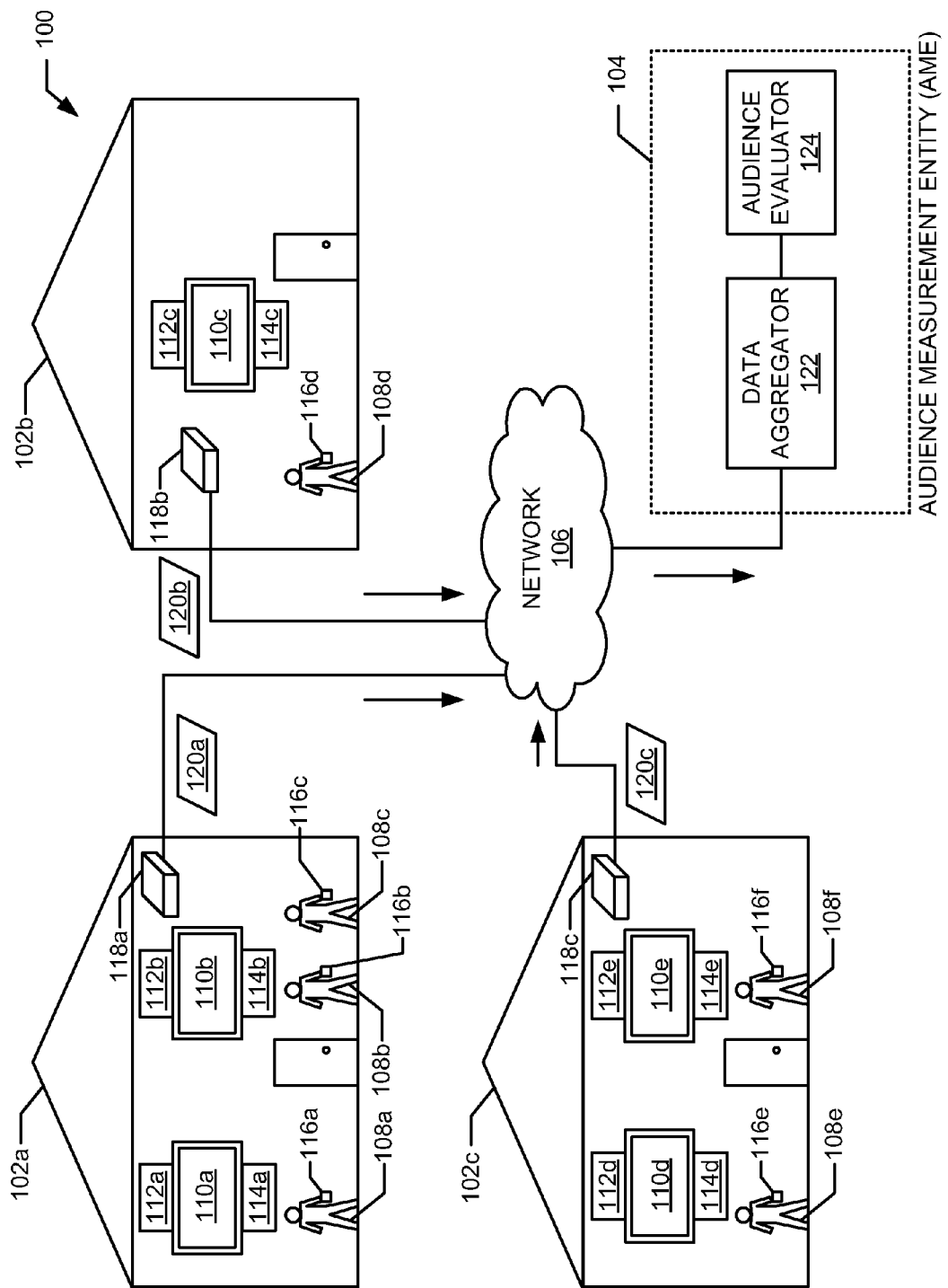
FIG. 1 is a block diagram of an example environment in which an audience measurement entity determines a characteristic of a media audience of a population based on partial panelist data collected from panelists of the population.

Audience measurement entities (AMEs) and other entities measure a composition and size of audiences consuming media to produce ratings of the media. Ratings are used by advertisers and/or marketers to purchase advertising space and/or design advertising campaigns. Additionally, media producers and/or distributors use the ratings to determine how to set prices for advertising space and/or to make programming decisions.

To measure the composition and size of an audience, AMEs (e.g., The Nielsen Company®) and other entities enlist panelist households of a population (e.g., a sample population or sub-population of a population as a whole) to participate in measurement panels. The AMEs subsequently extrapolate characteristics of the panelist households onto the population as a whole to measure a composition and size of an audience of media.

As used herein, a "panelist" refers to an audience member who consents to an AME or other entity collecting person-specific data from the audience member. A "panelist household" refers to a household including an audience member who consents to an AME or other entity collecting person-specific data from the audience member and/or other members of the household.

The AMEs and other entities obtain data (e.g., demographics data, household characteristics data, tuning data, presentation data, exposure data, etc.) from members of the panelist households. For example, AMEs or other entities collect demographics data (age, gender, income, race, nationality, geographic location, education level, religion, etc.) from panelist household members via, for example, self-reporting by the panelist household members and/or receiving consent from the panelist household members to obtain demographics information from database proprietors (e.g., Facebook®, Twitter®, Google®, Yahoo! ®, MSN®, Apple®, Experian®, etc.). Further, the AMEs track tuning of, presentation of and/or exposure to media (e.g., television programming, advertising, etc.) within the panelist households. For example, the AMEs obtain consent from members of the panelist households to collect tuning data, presentation data, and/or exposure data associated with the panelist households and/or the members of the panelist households. Upon collecting the demographics data, the household characteristics data, the tuning data, the presentation data and/or the exposure data of the panelist households, the AMEs associate the demographics data and/or the household characteristics data of the panelist households with media tuned, presented and/or exposed to within the panelist households to project a size and demographic makeup of a population as a whole.

As used herein, "tuning data" refers to information pertaining to tuning events (e.g., a media presentation device being turned on or off, channel changes, media stream selections, media file selections, volume changes, tuning duration times, etc.) of a media presentation device of a panelist household. To collect the tuning data of a media presentation device, an AME or other entity typically obtains consent from the household for such data acquisition. An example media presentation device is a set top box (STB). An STB is a device that converts source signals into media presented via a media output device such as a television or video monitor. In some examples, the STB implements a digital video recorder (DVR) and/or a digital versatile disc (DVD) player. Other types of media presentation devices from which data may be collected include televisions with media tuners and/or media receivers, over-the-top devices (e.g., a Roku media device, an Apple TV media device, a Samsung TV media device, a Google TV media device, a Chromecast media device, an Amazon TV media device, a gaming console, a smart TV, a smart DVD player, an audio-streaming device, etc.), stereos, speakers, computers, portable devices, gaming consoles, online media output devices, radios, etc. Some media presentation devices are capable of recording tuning data corresponding to media output by media output devices.

As used herein, "presentation data" refers to information pertaining to media events that are presented via a media output device (e.g., a television, a stereo, a speaker, a computer, a portable device, a gaming console, and/or an online media output device, etc.) of a panelist household regardless of whether the media event is exposed to a member of the panelist household via the media output device. As used herein, "exposure data" refers to information pertaining to media exposure events that are presented via a media output device (e.g., a television, a stereo, a speaker, a computer, a portable device, a gaming console, and/or an online media output device, etc.) of a panelist household and are exposed to a member (e.g., so that the media may be viewed, heard, perceived, etc. by the member) of the panelist household. Presentation data and/or exposure data may be collected via a meter (e.g., a people meter) that monitors media output device(s) and/or member(s) of a household. A people meter (e.g., a personal people meter) is an electronic device that is typically positioned in a media access area (e.g., a viewing area such as a living room of the panelist household) and is proximate to and/or carried by one or more panelists. To collect exposure data, a panelist may interact with the people meter that monitors the media output device(s) of the panelist household.

Thus, example tuning data includes information pertaining to an event associated with a media presentation device (e.g., an STB) of a household, example presentation data includes information pertaining to an event associated with a media output device (e.g., a television) of the household, and example exposure data pertains to an event of a member associated with the household. As an example, tuning data may indicate that an STB of the household is turned on and outputting a particular media stream to a television, presentation data may indicate that a television of the household was turned on and presenting the particular media, and exposure data may indicate that a member of the household was exposed to the particular media that was tuned by the STB and presented by the television of the household. As used herein, an "activity" refers to any event related to a media presentation device (e.g., a tuning event), a media output device (e.g., a presentation event, and/or a member (e.g., an exposure event, a viewing event, etc.) of a household (e.g., a panelist household). Example activities include total tuning minutes of a population, total presentation minutes of a population, total exposure minutes of a population, total viewing minutes of a population, etc.

As used herein, a "characteristic" refer to trait(s), attribute(s) and/or property(ies) of a population (e.g., a sample population of panelists), a household (e.g., a panelist household), and/or a member (e.g., a panelist, a member of a panelist household, etc.). For example, characteristics include traits related to panelists (e.g., demographics of household members) and/or media presentation devices, media output devices, and/or structural attributes of the panelist households. Example characteristics include a quantity of members in a household, a quantity of media output devices (e.g., television sets), a quantity of media presentation devices (e.g., STBs), a number of female and/or male panelists, a number of bedrooms in a household, etc.

By collecting tuning data, presentation data, viewing data, demographics data, household characteristics data, etc., AMEs and other entities amass a great amount of data from the panelists. To enable the large amount of collected data to be utilized to measure a composition and size of audiences, AMEs and other entities aggregate the collected data. As used herein, "aggregate data" refers to non-person-specific data and non-household-specific data of a population that indicates a quantity (e.g., a count) and/or a percentage of members and/or households of a population that match partitioned activity(ies) and/or characteristic(s) of interest.

Example aggregate data are partitioned into mutually exclusive marginals within a dimension. As used herein, a type of attribute is referred to as a "dimension." For example, dimensions include a number of televisions in a household, a number of members of a household, a demographic dimension (e.g., age, gender, age and gender, income, race, nationality, geographic location, education level, religion, etc.), etc. A dimension may include, be made up of, and/or be divided into different groupings. As used herein, each grouping of a dimension is referred to as a "marginal" and/or a "bucket." Each marginal of a dimension is distinct, separate and/or otherwise partitioned from the other marginals of the dimension such that no household and/or household member can satisfy more than one marginal within the dimension. Example methods and apparatus to partition activities and/or characteristics are described in U.S. patent application Ser. No. 14/860,361, which was filed on Sep. 21, 2015, and is hereby incorporated by reference in its entirety.

Thus, example aggregate data include total tuning minutes for households of a population having two televisions, total tuning minutes for households of a population having three televisions, total tuning minutes for a population, total presentation minutes for households of a population having three members, total presentation minutes for households of a population having four members, total presentation minutes for a population, etc.

Further, to measure a composition and size of audiences, AMEs and other entities may utilize partial aggregate data of a population. As used herein, "partial aggregate data," "partial panelist data," and "partial data" refer to aggregate data of a population that relates to some, but not all, of the partitioned aggregate data. By utilizing partial aggregate data, AMEs and other entities further reduce an amount of data that is processes to measure a composition and size of audiences of a population.

Example methods and apparatus disclosed herein utilize partial panelist data to estimate portions of a population that match respective combinations of activities and characteristics of interest based on entropy probability (e.g., maximum entropy probability). In some examples, methods and apparatus disclosed herein calculate lower bounds and upper bounds for the respective estimated portions. Based on the portions, the upper bounds and/or the lower bounds, the example methods and apparatus disclosed herein determine audience characteristics (e.g., audience composition, audience distribution, audience size, etc.) of the population.

As used herein, a "portion" refers to a quantity (e.g., a count, a percentage, etc.) of members (e.g., panelists) of a population (e.g., a sample population) that match, satisfy, and/or belong to a combination of activity(ies) and/or characteristic(s) of interest. An example portion indicates a percentage of panelist households that have a tuned media presentation device and include three members and two television sets. An example portion may represent a probability that a member (e.g., a panelist) and/or household (e.g., a panelist household) of a population (e.g., a sample population) matches a combination of interest. For example, the portion associated with panelist households having a tuned media presentation device, two televisions, and three members represents a probability that a panelist household chosen at random has a tuned media presentation device, two televisions, and three members.

To estimate portions of a population that match activity and/or characteristic combinations of interest, example methods and apparatus collect partial aggregate data (e.g., a measurement) of the population for activities associated with characteristics. For example, an AME or other entity may collect a number of minutes tuned by households having three members, a number of minutes tuned by households having two televisions, a total number of minutes tuned by a population, etc. Further, example methods and apparatus identify combinations based on the activities and/or characteristics of the partial aggregate data. For example, the AME or other entity identifies a combination of tuned households having three members and two televisions, a combination of tuned households not having three members or two televisions, a combination of tuned households having three members but not two televisions, a combination of tuned households not having three members but having two televisions, etc.

The example methods and apparatus construct a constraint matrix based on the identified activities associated with the characteristics and the identified combinations of activities and characteristics. For example, the AME or other entity assigns the activities associated with the characteristics as respective rows of the constraint matrix, assigns the combinations as respective columns of the constraint matrix, and inserts values (e.g., a '1' or a '0') in elements of the constraint matrix that represent whether the corresponding activity associated with the characteristic includes the corresponding combination. For example, tuned households having three members does include tuned households having three members but not two televisions (e.g., represented by a '1' in the corresponding element of the constraint matrix) but does not include tuned households not having three members but having two televisions (e.g., represented by a '0' in the corresponding element of the constraint matrix). In other example methods and apparatus, the combinations are assigned as respective rows in the constraint matrix and the activities associated with the characteristics are assigned as respective columns in the constraint matrix.

Further, example methods and apparatus disclosed herein construct a combination total set based on the partial aggregate data collected for the activities associated with the characteristics. For example, the example methods and apparatus insert measurements (e.g., values) of the activities associated with the characteristics in corresponding elements of the combination total set. The example combination total set includes measurements for the same activities associated with the characteristics that are represented in the example constraint matrix, such that each element of the combination total set corresponds to a row (or, alternatively, a column) in the constraint matrix.

Based on the constructed constraint matrix and the constructed combination total set, the example methods and apparatus disclosed herein estimate portions of the population that match the identified combinations of activities and characteristics based on entropy probabilities. For example, methods and apparatus disclosed herein may estimate percentages of tuned households within a population that have three members and two televisions, that do not have three members or two televisions, that have three members but do not two televisions, that do not have three members but do have two televisions, etc.

Example methods and apparatus may perform non-linear optimization of the constraint matrix and the constraint combination total set to calculate the entropy probabilities using a Jacobian and multivariate Newton's method. Some example methods and apparatus disclosed herein calculate upper bounds and lower bounds for the respective estimated portions. In some such examples, a lower bound represents an absolute minimum value for a combination that enables constraints of all other combinations to be satisfied, and an upper bound represents an absolute maximum value for the combination that enables the constraints of all other combinations to be satisfied. In other examples, the lower bound and the upper bound represent relative bounds that enable the constraints of all other combinations to be satisfied.

Upon estimating the portions and the calculating the respective upper and lower bounds for the combinations of activities and characteristics, the AME or entity utilizes the portions, lower bounds, and/or upper bounds to determine audience characteristics of the population. For example, the AME may utilize the portions, lower bounds, and/or upper bounds to calculate a probability that, for households having three members and two television sets, a media presentation device is tuned to but a presentation device is not presenting a media event.

Disclosed example methods to determine characteristics of media audiences include creating, via a processor, a constraint matrix based on a first activity associated with a first characteristic of a population, the first activity associated with a second characteristic of the population, and a first combination associated with at least one of the first activity, the first characteristic, and the second characteristic. The example methods also include creating, via the processor, a combination total set based on a first measurement for the first activity associated with the first characteristic and a second measurement for the first activity associated with the second characteristic. The example methods also include computing, via the processor, a first entropy probability based on the constraint matrix and the combination total set. The example methods also include estimating, via the processor, a first portion of the population that matches the first combination based on the first entropy probability.

In some example methods, creating the constraint matrix is further based on the first activity associated with a third characteristic of the population.

In some example methods, creating the constraint matrix is further based on a second activity associated with the first characteristic and the second activity associated with the second characteristic.

In some example methods, creating the constraint matrix is further based on a second combination associated with at least one of the first activity, the first characteristic, and the second characteristic. The second combination is different than the first combination. Some such example methods further include computing, via the processor, a second entropy probability based on the constraint matrix and the combination total set and estimating, via the processor, a second portion of the population that matches the second combination based on the second entropy probability.

Some example methods further include calculating a lower bound of the first portion and an upper bound of the first portion.

Some example methods further include determining an audience characteristic of the population based on the first portion.

In some example methods, the first characteristic and the second characteristic include at least one of panelist households having a first quantity of members, panelist households having a second quantity of television sets, and all panelist households.

In some example methods, the first activity includes total tuning minutes or total presentation minutes.

In some example methods, creating the constraint matrix includes assigning the first activity associated with the first characteristic as a first row of the constraint matrix, assigning the first activity associated with the second characteristic as a second row of the constraint matrix, and assigning the first combination as a column of the constraint matrix.

In some example methods, calculating the first entropy probability includes performing non-linear optimization of the constraint matrix and the combination total set using a Jacobian and multivariate Newton's method.

In some example methods, computing the first entropy probability includes approximating a first maximum entropy probability.

In some example methods estimating the first portion of the population based on the first entropy probability reduces an amount of audience data collected by the processor to identify an audience characteristic of the population by utilizing partial panelist data to determine the audience characteristic.

In some example methods, the processor includes at least a first processor of a first hardware computer system and a second processor of a second hardware computer system.

Disclosed example apparatus to determine characteristics of media audiences include a constraint constructor to create a constraint matrix based on a first activity associated with a first characteristic of a population, the first activity associated with a second characteristic of the population, and a first combination associated with at least one of the first activity, the first characteristic, and the second characteristic. The constraint constructor is to create a combination total set based on a first measurement for the first activity associated with the first characteristic and a second measurement associated with the second characteristic. The example apparatus also include a probability calculator to compute a first entropy probability based on the constraint matrix and combination total set. The probability calculator is to estimate a first portion of the population that matches the first combination based on the first entropy probability.

In some example apparatus, the constraint constructor is to create the constraint matrix further based on the first activity associated with a third characteristic of the population.

In some example apparatus, the constraint constructor is to create the constraint matrix further based on a second activity associated with the first characteristic and the second activity associated with the second characteristic.

In some example apparatus, the constraint constructor is to create the constraint matrix further based on a second combination associated with at least one of the first activity, the first characteristic, and the second characteristic. The second combination is different than the first combination. In some such example apparatus, the probability calculator further is to compute a second entropy probability based on the constraint matrix and the combination total set and estimate a second portion of the population that matches the second combination based on a second entropy probability.

In some example apparatus, the probability calculator is to calculate a lower bound of the first portion and an upper bound of the first portion.

Some example apparatus further include a characteristic determiner to determine an audience characteristic of the population based on the first portion.

In some example apparatus, the first characteristic and the second characteristic include at least one of panelist households having a first quantity of members, panelist households having a second quantity of television sets, and all panelist households.

In some example apparatus, the first activity includes total tuning minutes or total presentation minutes.

In some example apparatus, to create the constraint matrix, the constraint constructor assigns the first activity associated with the first characteristic as a first row of the constraint matrix, assigns the first activity associated with the second characteristic as a second row of the constraint matrix, and assigns the first combination as a column of the constraint matrix.

In some example apparatus, to calculate the first entropy probability, the probability calculator performs non-linear optimization of the constraint matrix and the combination total set using a Jacobian and multivariate Newton's method.

In some examples apparatus, to compute the first entropy probability, the constraint constructor approximates a first maximum entropy probability.

In some example apparatus, the probability calculator estimates the first portion of the population based on the first entropy probability to reduce an amount of audience collected by a processor to identify an audience characteristic of the population by utilizing partial panelist data to determine the audience characteristic.

Turning to the figures, FIG. 1 illustrates an example environment 100 in which audience characteristics of a population are determined based on partial aggregate data of the population. In the illustrated example, the environment 100 includes example households 102*a*, 102*b*, 102*c* of a population (e.g., a sample population, a sub-population of a population as a whole, a panelist population, etc.). As illustrated in FIG. 1, the example environment 100 includes an audience measurement entity (AME) 104 that determines the audience characteristics of the population based on partial panelist data associated with the households 102*a*, 102*b*, 102*c* and a network 106 that communicatively couples the households 102*a*, 102*b*, 102*c* of the population to the AME 104.

The households 102*a*, 102*b*, 102*c* of the illustrated example are panelist households of the population from which data is collected to estimate audience characteristics members and/or household members of the population (e.g., a probability that a household having three members, two televisions and a tuned media presentation device is being presented media via one of the two televisions). According to the illustrated example, the households 102*a*, 102*b*, 102*c* of FIG. 1 constitute a fraction of the households of the population. The example households 102*a*, 102*b*, 102*c* are representative of many other households of the sample population. In some examples, characteristics of the other households are similar to and/or are different from those of the representative households 102*a*, 102*b*, 102*c*. For example, other households of the sub-population may include one member, three members, five members, etc. The households (e.g., the households 102*a*, 102*b*, 102*c*) of the sample population may be enlisted using any desired methodology (e.g., random selection, statistical selection, phone solicitations, Internet advertisements, surveys, advertisements in shopping malls, product packaging, etc.).

The panelist households 102a, 102b, 102c of the illustrated example include members (e.g., panelist household members) of the sub-population. For example, the household 102a includes members 108a, 108b, 108c, the household 102b includes member 108d, and the household 102c includes members 108e, 108f. As illustrated in FIG. 1, the households 102a, 102b, 102c include media output devices (e.g., televisions, stereos, speakers, computers, portable devices, gaming consoles, and/or an online media output devices, etc.) that present media (e.g., television programming, movies, advertisements, Internet-based programming such as websites, etc.) to the members 108a, 108b, 108c, 108d, 108e, 108f of the respective households 102a, 102b, 102c. For example, the household 102a includes televisions 110a, 110b for presenting media, the household 102b includes a television 110c for presenting media, and the household 102c includes television 110d, 110e for presenting media.

The example televisions 110a, 110b, 110c, 110d, 110e are communicatively coupled to respective example meters 112a, 112b, 112c, 112d, 112e (e.g., stationary meters, set-top box meters, etc.) that are placed in, on, under, and/or near the televisions 110a, 110b, 110c, 110d, 110e to monitor tuned media. The meters 112a, 112b, 112c, 112d, 112e of the illustrated example collect information pertaining to tuning events (e.g., a set-top box being turned on or off, channel changes, volume changes, tuning duration times, etc.) associated with the televisions 110a, 110b, 110c, 110d, 110e of the households 102a, 102b, 102c. For example, the meter 112a collects tuning data associated with the television 110a, the meter 112b collects tuning data associated with television 110b, the meter 112c collects tuning data associated with the television 110c, the meter 112d collects tuning data associated with the television 110d, and the meter 112e collects tuning data associated with the television 110e. Thus, the example meters 112a, 112b collect tuning data associated with the household 102a (e.g., total tuning minutes of the household 102a), the example meter 112c collects tuning data associated with the household 102b (e.g., total tuning minutes of the household 102b), and the example meters 112d, 112e collect tuning data associated with the household 102c (e.g., total tuning minutes of the household 102c). In the illustrated example, the collected tuning data does not indicate which, if any, of the televisions (110a, 110b, 110c, 110d, 110e) presented the media or which, if any, of the members (e.g., the members 108a, 108b, 108c, 108d, 108e, 108f) were exposed to the tuned media.

As illustrated in FIG. 1, meters 114a, 114b, 114c, 114d, 114e (e.g., people meters) are placed in, on, under, and/or near the televisions 110a, 110b, 110c, 110d, 110e to monitor media presented via the respective televisions 110a, 110b, 110c, 110d, 110e. The example meters 114a, 114b, 114c, 114d, 114e collect information pertaining to presentation events (e.g., a television being turned on or off, channel changes, volume changes, presentation duration times, etc.) associated with the televisions 110a, 110b, 110c, 110d, 110e of the households 102a, 102b, 102c. For example, the meter 114a collects presentation data associated with the television 110a, the meter 114b collects presentation data associated with television 110b, the meter 114c collects presentation data associated with the television 110c, the meter 114d collects presentation data associated with the television 110d, and the meter 114e collects presentation data associated with the television 110e. Thus, the example meters 114a, 114b collect presentation data associated with the household 102a (e.g., total presentation minutes of the household 102a), the example meter 114c collects presentation data associated with the household 102b (e.g., total presentation minutes of the household 102b), and the example meters 114d, 114e collect presentation data associated with the household 102c (e.g., total presentation minutes of the household 102c). In the illustrated example, the collected presentation data does not indicate which, if any, of the members (e.g., the members 108a, 108b, 108c, 108d, 108e, 108f) were exposed to the presented media. In other examples, the meters 114a, 114b, 114c, 114d, 114e may monitor exposure data of media presented via the televisions 110a, 110b, 110c, 110d, 110e by identifying panelists (e.g., the members 102a, 102b, 102c, 102d, 102e) located in respective media access areas of the televisions 110a, 110b, 110c, 110d, 110e.

Further, the environment 100 of the illustrated example includes meters 116a, 116b, 116c, 116d, 116e, 116f (e.g., personal people meters) that are worn, carried by, and/or otherwise positioned on or near the corresponding members 108a, 108b, 108c, 108d, 108e, 108f of the population. The example meters 116a, 116b, 116c, 116d, 116e, 116f collect information pertaining to media events that are exposed to the members 108a, 108b, 108c, 108d, 108e, 108f of the respective households 102a, 102b, 102c (e.g., via the televisions 110a, 110b, 110c, 110d, 110e of the households 102a, 102b, 102c). For example, the meter 116a collects exposure data associated of the member 102a, the meter 116b collects exposure data associated of the member 102b, the meter 116c collects exposure data associated of the member 102c, the meter 116d collects exposure data associated of the member 102d, the meter 116e collects exposure data associated of the member 102e, and the meter 116f collects exposure data associated of the member 102f. Thus, the example meters 116a, 116b, 116c collect exposure data associated with the household 102a (e.g., total exposure minutes of the household 102a), the example meter 116d collects exposure data associated with the household 102b (e.g., total exposure minutes of the household 102b), and the example meters 116e, 116f collect exposure data associated with the household 102c (e.g., total exposure minutes of the household 102c). Additionally or alternatively, the meters 116a, 116b, 116c, 116d, 116e, 116f may monitor media presented by the televisions 110a, 110b, 110c, 110d, 110e when the corresponding members 108a, 108b, 108c, 108d, 108e, 108f are proximate to and/or within media access areas of the televisions 110a, 110b, 110c, 110d, 110e.

In the environment 100 of the illustrated example, characteristics data (e.g., household characteristics data) is collected for the households 102a, 102b, 102c of the population. For example, the collected characteristics data pertains to household characteristics (e.g., a number of members of a household, a number of televisions in a household, household income, etc.) of the households 102a, 102b, 102c and/or characteristics of the household members 108a, 108b, 108c, 108d, 108e, 108f (e.g., gender, occupation, salary, race and/or ethnicity, marital status, highest completed education, current employment status, etc.). In some examples, the characteristics data are determined through various methods during an enrollment process (e.g., via telephone interviews, via online surveys, via door-to-door surveys, via self-reporting, etc.) of the corresponding households 102a, 102b, 102c. In some examples, the characteristics data (e.g., demographics data) is collected by the members 108a, 108b, 108c, 108d, 108e, 108f of the population providing consent to the AME 104 to obtain the data from database proprietors (e.g., Facebook, Twitter, Google, Yahoo!, MSN, Apple, Experian, etc.). In some examples, characteristics data is collected via the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f* of the households 102*a*, 102*b*, 102*c*. For example, data collected from the meters 112*a*, 112*b*, the meters 114*a*, 114*b*, and/or the meters 116*a*, 116*b*, 116*c* may indicate a number of televisions present within the household 102*a*. Additionally or alternatively, the meters 114*a*, 114*b*, and/or the meters 116*a*, 116*b*, 116*c* may indicate a number of members of the household 102*a*.

According to the illustrated example, watermarks, metadata, signatures, etc. collected and/or generated by the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f* for use in identifying the media and/or a station that transmits the media are part of media exposure data collected by the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f*.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In the illustrated example, the tuning data, the presentation data, the exposure data and/or the characteristics data of the households 102*a*, 102*b*, 102*c* are collected by home processing systems 118*a*, 118*b*, 118*c* of the corresponding households 102*a*, 102*b*, 102*c*. The example household processing systems 118*a*, 118*b*, 118*c* are communicatively coupled the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f* of the corresponding households 102*a*, 102*b*, 102*c* via a wireless and/or a hardwired connection. From time to time, the home processing systems 118*a*, 118*b*, 118*c* of the illustrated example collect the data (e.g., the tuning data, the presentation data, the exposure data, the characteristics data, etc.) from the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f*.

As illustrated in FIG. 1, the home processing systems 118*a*, 118*b*, 118*c* communicate household data 120*a*, 120*b*, 120*c* of the corresponding households 102*a*, 102*b*, 102*c* of the population to the AME 104. For example the household data 120*a*, 120*b*, 120*c* communicated to the AME 104 includes the tuning data, the presentation data, the exposure data, the characteristics data, etc. collected by the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f* of the respective households 102*a*, 102*b*, 102*c*. As illustrated in FIG. 1, the example home processing systems 118*a*, 118*b*, 118*c* communicate the household data 120*a*, 120*b*, 120*c* to the AME 104 via the network 106 (e.g., the Internet, a local area network, a wide area network, a cellular network, etc.) and wired and/or wireless connections (e.g., a cable/DSL/satellite modem, a cell tower, etc.). In some examples, the meters 112*a*, 112*b*, 112*c*, 112*d*, 112*e*, the meters 114*a*, 114*b*, 114*c*, 114*d*, 114*e*, and/or the meters 116*a*, 116*b*, 116*c*, 116*d*, 116*e*, 116*f* communicate the collected data to the AME 104 via the network 106.

The AME 104 of the illustrated example includes a data aggregator 122 and an audience evaluator 124. As illustrated in FIG. 1, the data aggregator 122 collects the household data 120*a*, 120*b*, 120*c* of the households 102*a*, 102*b*, 102*c* of the population.

Further, the example data aggregator 122 aggregates the household data 120*a*, 120*b*, 120*c* into aggregate data of the population based on activities (e.g., total tuning minutes, total presentation minutes, total exposure minutes, etc.) and/or characteristics (e.g., a number of televisions in a household, a number of household members, etc.) of interest. For example, the data aggregator 122 aggregates the data of the population based on activities (e.g., total tuning minutes, total presentation minutes, total exposure minutes, etc.) associated with partitioned marginals (e.g., one television, two televisions, three televisions, etc.) of household characteristic dimensions (e.g., number of televisions in a household) of interest. Thus, example aggregate data of the population includes total tuning minutes for households having one television, total tuning minutes for households having two televisions, total tuning minutes for households having three televisions, etc.

The example audience evaluator 124 of the AME 104 estimates portions of the population (e.g., percentages) that match combinations of activities and/or household characteristics of interest based on entropy probabilities. Further, the audience evaluator determines an audience characteristic of the population based on the calculated portions.

The audience evaluator 124 of the illustrated example collects partial aggregate data from the data aggregator 122. For example, to reduce an amount of data to process, the audience evaluator 124 collects the partitioned aggregate data for the activities associated with some, but not necessarily all, of the partitioned marginals of household characteristic dimensions of interest. For example, the audience evaluator 124 may collect aggregate data for only a few activities associated with household characteristics such as total tuning minutes for households having two televisions, total presentation minutes for households having two televisions, total tuning minutes for households having three members, total presentation minutes for households having three members, total tuning minutes of the population, and total presentation minutes of the population.

Based on entropy probabilities, the audience evaluator 124 of the AME 104 estimates portions (e.g., percentages) of the population that match, satisfy and/or belong to combinations of the activities and the household characteristics of the partial aggregate data collected from the data aggregator 122. For example, as disclosed below in further detail in connection with the probability calculator 206 of FIG. 2 and the machine readable instructions 322 of FIG. 6, the audience evaluator 124 may estimate percentages of households of the population in which media is tuned that (1) includes three members and two televisions and is presenting the tuned media, (2) includes three members and two televisions and is not presenting the tuned media, (3) includes three members, does not include two televisions and is presenting the tuned media, (4) includes three members, does not include two televisions and is not presenting the tuned media, etc.

Further, the audience evaluator 124 of the AME 104 may calculate lower bounds and upper bounds for the respective combinations of activities and household characteristics. Example lower bounds represent absolute minimum values for the respective combinations that enable constraints of all the combinations to be satisfied, and example upper bounds represent absolute maximum values for the respective combinations that enables the constraints of all the combinations to be satisfied. For example, the audience evaluator 124 calculates the lower bounds and the upper bounds via a linear programming technique independent of the entropy probabilities and independent of a methodology utilized to collect the data (e.g., demographics data, household characteristics data, tuning data, presentation data, exposure data, etc.) from the population. In other examples, the lower bound and the upper bound represent relative bounds that enable the constraints of all other combinations to be satisfied.

The audience evaluator 124 of the illustrated example utilizes the estimated portions, the calculated lower bounds, and/or the calculated upper bounds to answer queries for the population regarding the activities and household characteristics of the partial aggregate data. For example, the audience evaluator 124 estimates a likelihood of a household that is tuned to and presented media includes two televisions.

In operation, the example meters 112a, 112b, 112c, 112d, 112e collect tuning data of the corresponding households 102a, 102b, 102c of the population. The example meters 114a, 114b, 114c, 114d, 114e collect presentation data of the respective example televisions 110a, 110b, 110c, 110d, 110e of the households 102a, 102b, 102c. The example meters 116a, 116b, 116c, 116d, 116e, 116f collect exposure data of the example members 108a, 108b, 108c, 108d, 108e, 108f of the households 102a, 102b, 102c. Further, characteristics data is collected from the members 108a, 108b, 108c, 108d, 108e, 108f via the meters 112a, 112b, 112c, 112d, 112e, the meters 114a, 114b, 114c, 114d, 114e, the meters 116a, 116b, 116c, 116d, 116e, 116f, and/or other methodologies (e.g., surveys).

The example home processing systems 118a, 118b, 118c collect the household data 120a, 120b, 120c of the corresponding households 102a, 102b, 102c (e.g., the tuning data, the presentation data, the exposure data, the characteristics data of the meters 112a, 112b, 112c, 112d, 112e, the meters 114a, 114b, 114c, 114d, 114e and/or the meters 116a, 116b, 116c, 116d, 116e, 116f) and communicates the household data 120a, 120b, 120c to the example data aggregator 122 of the example AME 104 via the example network 106. The data aggregator 122 aggregates the household data 120a, 120b, 120c into aggregate data of the population based on activities (e.g., total tuning minutes, total presentation minutes, total exposure minutes, etc.) and/or characteristics (e.g., a number of televisions in a household, a number of household members, etc.) of interest.

The example audience evaluator 124 of the AME 104 collects partial aggregate data from the data aggregator 122. The audience evaluator 124 of the illustrated example collects partial aggregate data from the data aggregator 122. Based on the partial aggregate data, the audience evaluator 124 of the AME 104 estimates portions (e.g., percentages) of the population that match, satisfy and/or belong to combinations of the activities and the household characteristics of interest. The audience evaluator 124 utilizes the estimated portions to answer queries of the population regarding the activities and household characteristics of the partial aggregate data.

Determining a characteristic of a media audience of a population by estimating, via entropy probabilities, portions of the population that match combinations of activities and households characteristics of interest provides a solution to the technological problem of reducing an amount of computations executed by a processor to determine a characteristic of a media audience by utilizing partial aggregate data of the population collected from computer networked data collection systems. Thus, less processor utilization and network bandwidth consumption is achieved by the disclosed methods and apparatus that utilize information collected from the population.

Figure 2:
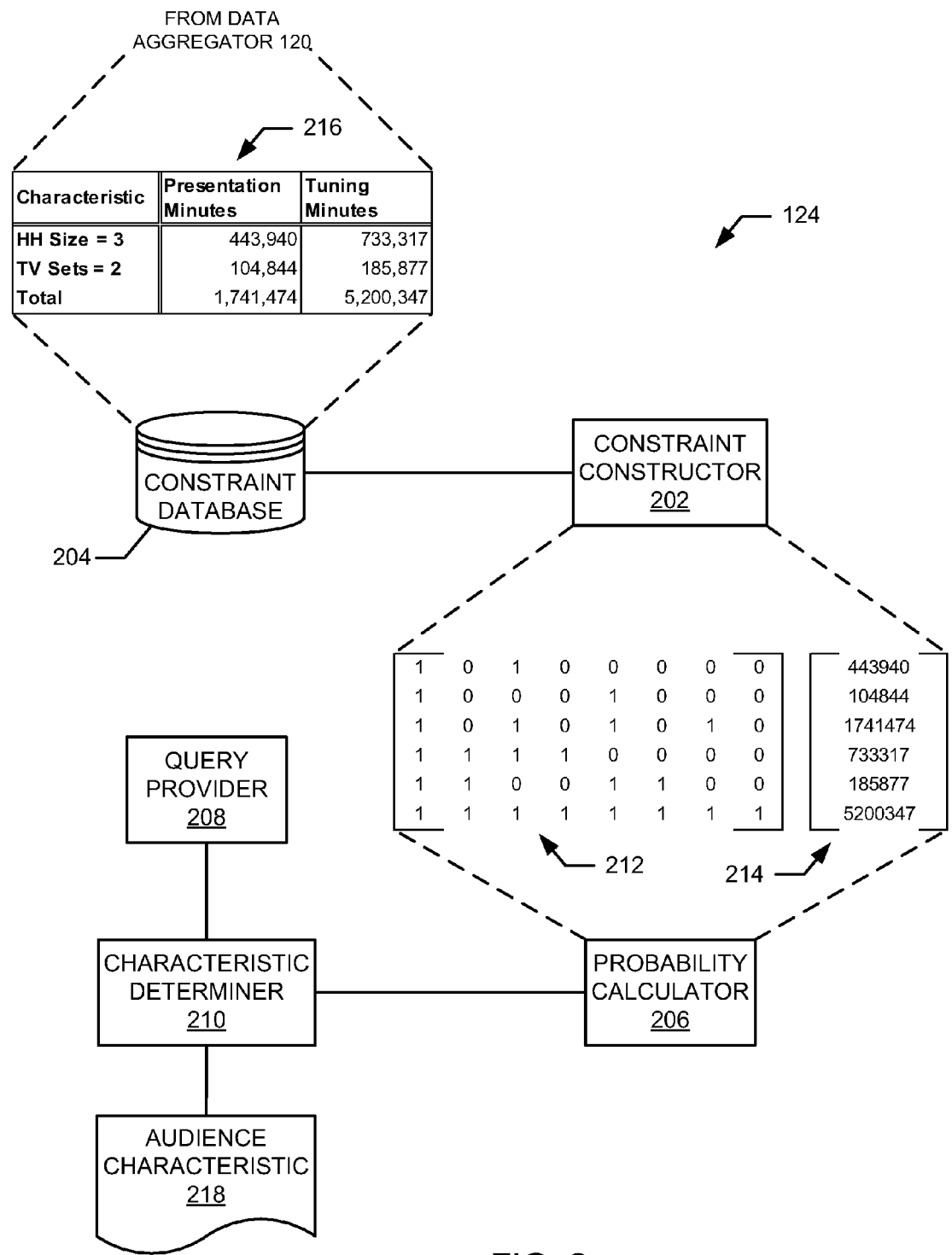
FIG. 2 is a block diagram of an example audience evaluator of the system FIG. 1 that is to determine the characteristic of the media audience of the population.

FIG. 2 is a block diagram of an example implementation of the audience estimator 124 of FIG. 1 that is to estimate portions of households of a population that match combinations of activities and characteristics of interest. As illustrated in FIG. 2, the example audience estimator 122 includes an example constraint constructor 202, an example constraint database 204, an example probability calculator 206, an example query provider 208, and an example characteristic determiner 210.

In the illustrated example, the constraint constructor 202 identifies activities associated with characteristics (e.g., household characteristics) of interest of the population. The example constraint constructor 202 identifies activities and characteristics of the population that are associated with the aggregate data of the example data aggregator 122 of FIG. 1. For example, the activities and the characteristics identified by the constraint constructor 202 include activities and characteristics associated with the household data 120a, 120b, 120c collected from the respective households 102a, 102b, 102c of the population such as tuning data (e g, tuning data collected from the example meters 112a, 112b, 112c, 112d, 112e of FIG. 1), presentation data (e.g., presentation data collected from the example meters 114a, 114b, 114c, 114d, 114e of FIG. 1), exposure data (e.g., exposure data collected from the example meters 116a, 116b, 116c, 112b, 116e, 116f of FIG. 1), and/or characteristics data (e.g., household characteristics data collected from the meters 112a, 112b, 112c, 112d, 112e, the meters 114a, 114b, 114c, 114d, 114e, the meters 116a, 116b, 116c, 116d, 116e, 116f, and/or other methodologies).

Example activities of interest include total tuning minutes, total presentation minutes, total exposure minutes, etc. Example characteristics of interest include households having one member (e.g., the example household 102b), households having two members (e.g., the example household 102c), households having three members (e.g., the example household 102a), households having one television (e.g., the example household 102b), households having two televisions (e.g., the example households 102a, 102c), households having three televisions, low-income households, middle-income households, high-income households, etc. In the illustrated example, the constraint constructor 202 identifies the following activities associated with characteristics: (1) total presentation minutes for households having three members, (2) total presentation minutes for households having two televisions, (3) total presentation minutes, (4) total tuning minutes for households having three members, (5) total tuning minutes for households having two televisions, and (6) total tuning minutes.

As illustrated in FIG. 2, the example constraint constructor 202 creates a constraint matrix 212 based on the identified activities associated with characteristics and based on combinations of the identified activities and characteristics. For example, the constraint constructor 202 assigns the activities associated with the characteristics as respective rows in the constraint matrix 212. In the illustrated example, the constraint constructor 202 (1) assigns the total presentation minutes for households having three members as a first row of the constraint matrix 212, (2) assigns the total presentation minutes for households having two televisions as a second row of the constraint matrix 212, (3) assigns the total presentation minutes as a third row of the constraint matrix 212, (4) assigns the total tuning minutes for households having three members as a fourth row of the constraint matrix 212, (5) assigns the total tuning minutes for households having two televisions as a fifth row of the constraint matrix 212, and (6) assigns the total tuning minutes as a sixth row of the constraint matrix 212.

As illustrated in FIG. 2, the example constraint constructor 202 assigns the combinations of the activities and the characteristics as columns in the constraint matrix 212. In the illustrated example, the constraint constructor 202 (1) assigns a combination for households having three members and two televisions in which media is tuned and presented as a first column, (2) assigns a combination for households having three members and two televisions in which media is tuned but not presented as a second column, (3) assigns a combination for households having three members but not two televisions in which media is tuned and presented as a third column, (4) assigns a combination for households having three members but not two televisions in which media is tuned but not presented as a fourth column, (5) assigns a combination for households not having three members but having two televisions in which media is tuned and presented as a fifth column, (6) assigns a combination for households not having three members but having two televisions in which media is tuned but not presented as a sixth column, (7) assigns a combination for households not having three members or two televisions in which media is tuned and presented as a seventh column, and (8) assigns a combination for households not having three members or two televisions in which media is tuned but not presented as an eighth column. In the illustrated example, the combinations assigned to the rows of the constraint matrix 212 represent every combination of the other identified activities (e.g., media is presented in the household) and characteristics (e.g., households having three members, households having two televisions) for households in which media is tuned.

To construct the example constraint matrix 212, the example constraint constructor 202 identifies the combinations that are included in the activities associated with the characteristics of interest. For example, the total presentation minutes for households having three members include households having three members and two televisions in which media is tuned and presented. Thus, as illustrated in FIG. 2, the constraint constructor inserts a '1' into an element of the example constraint matrix 212 that corresponds to the row (e.g., the first row) associated with the total presentation minutes for households having three members and the column (e.g., the first column) associated with households having three members and two televisions in which media is tuned and presented. Further, the total presentation minutes for households having three members include households having three members but not two televisions in which media is tuned and presented as a third column. Thus, as illustrated in FIG. 2, the constraint constructor 202 inserts a '1' into an element of the example constraint matrix 212 that corresponds to the row (e.g., the first row) associated with the total presentation minutes for households having three members and the column (e.g., the third column) associated with households having three members but not two televisions in which media is tuned and presented as a third column. In the illustrated example no other combinations are associated with the total presentation minutes for households having three members. As a result, the constraint constructor 202 inserts a '0' into the remaining elements of the first row of the example constraint matrix 212. As illustrated in FIG. 2, the constraint constructor inserts '0's and '1's into the elements of the example constraint matrix 212 that correspond to the rows of the other activities associated with characteristics and the columns of the identified combinations.

The example constraint constructor 202 creates a combination total set 214 based on the identified activities associated with characteristics of interest. The example constraint constructor 202 assigns activities associated with characteristics as elements of corresponding rows of the example combination total set 214. For example, the constraint constructor 202 (1) assigns the total presentation minutes for households having three members as an element of a first row of the combination total set 214, (2) assigns the total presentation minutes for households having two televisions as an element of a second row of the combination total set 214, (3) assigns the total presentation minutes as an element of a third row of the combination total set 214, (4) assigns the total tuning minutes for households having three members as an element of a fourth row of the combination total set 214, (5) assigns the total tuning minutes for households having two televisions as an element of a fifth row of the combination total set 214, and (6) assigns the total tuning minutes as an element of a sixth row of the combination total set 214. The example constraint constructor 202 assigns the same activities associated with the characteristics in the first row, the second row, the third row, etc. of the combination total set 214 as the constraint constructor assigns in the first row, the second row, the third, etc. of the constraint matrix 212. For example, the constraint constructor 202 assigns the total presentation minutes of households having three members as the first row in the constraint matrix 212 and as the element of the first row in the combination total set 214.

Further, the example constraint constructor 202 inserts partial aggregate data 216 of the identified activities associated with characteristics of interest into the combination total set 214. In the illustrated example, the partial aggregate data 216 is stored in the example constraint database 204 of the audience evaluator 124. In some examples, the partial aggregate data 216 of the constraint database 204 is obtained from the example data aggregator 122 of FIG. 1 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example partial aggregate data 216 stored in the example constraint database 204 includes measurements for the activities associated with characteristics. For example, the partial aggregate data 216 of FIG. 2 includes measurements for activities associated with characteristics that were assigned to corresponding rows of the example constraint matrix 212. The example partial aggregate data 216 includes measurements (or estimates) for the total presentation minutes for households having three members (e.g., 443,940 minutes), the total presentation minutes for households having two televisions (e.g., 104,844 minutes), the total presentation minutes (e.g., 1,741,474 minutes), the total tuning minutes for households having three members (e.g., 733,317 minutes), the total tuning minutes for households having two televisions (e.g., 185,877 minutes), and the total tuning minutes (e.g., 5,200,347 minutes).

Returning to the combination total set 214, the constraint constructor 202 collects the partial aggregate data 216 from the constraint database 204 that corresponds to the activities associated with characteristics of interest that are assigned rows in the combination total set 214. Upon collecting the partial aggregate data 216, the example constraint constructor inserts the collected measurements of the partial aggregate data 216 into the corresponding elements of the rows of the combination total set 214. For example, the constraint constructor inserts a measurement of '443,940' into the element of the first row of the combination total set 214 that is associated with the total presentation minutes for households having three members, inserts a measurement of '104,844' into the element of the second row of the combination total set 214 that is associated with the total presentation minutes for households having two televisions (e.g., 104,844 minutes), etc.

In other examples, the constraint constructor 202 may create the constraint matrix 212 such that the activities associated with the characteristics are assigned as columns and the combinations of the activities and characteristics are assigned as rows. Further, in some such examples, the constraint constructor 202 may create the combination total set 214 such that the partial aggregate data are assigned as elements in respective columns.

The probability calculator 206 of the illustrated example utilizes the constraint matrix 212 and the combination total set 214 created by the constraint constructor 202 to estimate, based on entropy probabilities (e.g., maximum entropy probabilities), portions (e.g., percentages, counts, etc.) of the households of the population (e.g., the households 102a, 102b, 102c) that match, satisfy and/or belong to the respective combinations of the activities and the characteristics. For example, the probability calculator 206 estimates the portions of the population that match combinations of activities and characteristics based on entropy probabilities that approach, are proximate to, and/or equal maximum entropy probabilities. While utilizing entropy probabilities is described herein, other non-linear methods, systems and/or techniques may be used to estimate portions of the households of the population that match combinations of activities and characteristics.

To calculate the portions of the population of interest, the example probability calculator 206 calculates entropy probabilities that correspond to the portions of the households of the population that match the combinations of the combinations of the activities and the characteristics. The example probability calculator 206 performs non-linear optimization to calculate entropy probabilities using a Jacobian and multivariate Newton's method based on the constraint matrix 212 and the combination total set 214 created by the example constraint constructor 202. In some examples, the probability calculator 206 performs non-linear optimization to calculate entropy probabilities using a Jacobian and multivariate Newton's method that approach, are proximate to, and/or equal maximum entropy probabilities. For example, the probability calculator 206 approximates and/or determines the maximum entropy probabilities by computing the maximum entropy probabilities, by computing entropy probabilities that satisfy a maximization threshold, by computing entropy probabilities that are determined to be sufficiently maximized, etc. For example, the multivariate Newton's method is an iterative method for computing an approximate solution of a system of equations (e.g., g(x)=0), and a Jacobian is a matrix of partial derivatives of component functions (e.g., component functions of g(x)) of the system of equations. While utilizing a Jacobian and multivariate Newton's method is described herein, other methods, systems and/or techniques may be used to calculate the entropy probabilities by performing non-linear optimization.

For example, to calculate the entropy probabilities, the probability calculator 206 approximates and/or determines a maximum of Equation 1 provided below (e.g., computes a maximum, performs a threshold number of iterations, performs iterations until a maximization threshold is satisfied).

$$-\sum_{i=1}^{n} p_i \log p_i \qquad \text{Equation 1}$$

In Equation 1 provided above, p represents probabilities that are to be calculated by the probability calculator 206. For example, p of Equation 1 includes probabilities $p_1$, $p_2$, $p_3$, $p_4$, $p_5$, $p_6$, $p_7$, $p_8$.

To calculate the entropy probabilities, the example probability calculator 206 approximates and/or determines a maximum of Equation 1 subject to constraints. For example, the probability calculator 206 approximates and/or determines a maximum of Equation 1 subject to a constraint that p be non-negative, represented by p≥0, to limit the probabilities $p_1$, $p_2$, $p_3$, $p_4$, $p_5$, $p_6$, $p_7$, $p_8$ to non-negative values. Additionally or alternatively, the example Equation 1 is constructed to limit the calculated probabilities to non-negative values. Further, the example probability calculator 206 approximates and/or determines a maximum of Equation 1 subject to an equality constraint, represented by Cp=D, in which C represents the example constraint matrix 212 and D represents the example combination total set 214.

The example probability calculator 206 approximates and/or determines a maximum of the example Equation 1 that is constructed so that a sum of $p_1$, $p_2$, $p_3$, $p_4$, $p_5$, $p_6$, $p_7$, and $p_8$ of p equals 100%. In the illustrated example, $p_1$ is associated with the combination of the activities and characteristics assigned to the first row of the example constraint matrix 212 and the example combination total set 214, $p_2$ is associated with the combination of the activities and characteristics assigned to the second row of the example constraint matrix 212 and the example combination total set 214, $p_3$ is associated with the combination of the activities and characteristics assigned to the third row of the example constraint matrix 212 and the example combination total set 214, etc.

As a result, the example probability calculator 206 calculates the entropy probabilities $p_1$, $p_2$, $p_3$, $p_4$, $p_5$, $p_6$, $p_7$, $p_8$ to calculate portions of the households of the population that satisfy the combinations of the activities and characteristics of interest of the population. For example, based on the example constraint matrix 212 and the example combination total set 214 of FIG. 2, the example probability calculator 206 calculates the entropy probabilities as provided in Table 1 below.

TABLE 1

| Combination | Probability |
| --- | --- |
| $p_1$ | 0.51% |
| $p_2$ | 0.13% |
| $p_3$ | 8.02% |
| $p_4$ | 5.43% |
| $p_5$ | 1.50% |
| $p_6$ | 1.43% |
| $p_7$ | 23.45% |
| $p_8$ | 59.52% |

As indicated above in Table 1, the probability calculator 206 estimates that (1) 0.51% of the households of the population have three members and two televisions in which media is tuned and presented, (2) 0.13% of the households of the population have three members and two televisions in which media is tuned but not presented, (3) 8.02% of the households of the population have three members but not two televisions in which media is tuned and presented, (4) 5.43% of the households of the population have three members but not two televisions in which media is tuned but not presented, (5) 1.50% of the households of the population have three members but having two televisions in which media is tuned and presented, (6) 1.43% of the households of the population have three members but having two televisions in which media is tuned but not presented, (7) 23.45% of the households of the population have three members or two televisions in which media is tuned and presented, and (8) 59.52% of the households of the population have three members or two televisions in which media is tuned but not presented.

Further, the probability calculator 206 of the illustrated example utilizes the example constraint matrix 212 and the example combination total set 214 created by the example constraint constructor 202 to calculate lower bounds and upper bounds for the identified combinations for the households of the population. For example, the lower bounds calculated by the example probability calculator 206 represent absolute minimum values for the corresponding combinations that enable constraints of the other combinations to be satisfied, and the upper bounds calculated by the example probability calculator 206 represent absolute maximum values for the corresponding combinations that enable the constraints of the other combinations to be satisfied. To calculate the lower bounds, the example probability calculator 206 utilizes a linear programming technique to minimize an equation based on the example constraint matrix 212 and the example combination total set 214 created by the constraint constructor 202. Further, to calculate the lower bounds, the example probability calculator 206 utilizes the linear programming technique to minimize an equation based on the example constraint matrix 212 and the example combination total set 214 created by the constraint constructor 202. The example probability calculator 206 utilizes the linear programming technique to calculate the lower bounds and the upper bounds such that the lower and upper bounds are calculated independently of the entropy probability calculated by the probability calculator 206. Alternatively, the example probability calculator 206 may calculate the entropy probabilities, the lower bounds, and the upper bounds together such that, for example, the lower and upper bounds are calculated dependently from the entropy probabilities.

For example, to calculate the lower bounds of the estimated portions, the probability calculator 206 minimizes $e^T x_i$ of which $e^T$ identifies the combination(s) associated with a particular lower bound and $x_i$ represents a corresponding lower bound value that is to be calculated. For example, $x_1$ represents the lower bound value for the identified combination of activities and characteristics associated with the first estimated portion ($p_1$), $x_2$ represents the lower bound value for the identified combination of activities and characteristics associated with the second estimated portion ($p_2$), $x_3$ represents the lower bound value for the identified combination of activities and characteristics associated with the third estimated portion ($p_3$), etc. The example probability calculator 206 minimizes (e.g., computes a minimum, computes a value(s) that satisfy(ies) a minimization threshold(s), computes a value(s) that is/are determined to be sufficiently minimized, etc.) $e^T x_i$ subject to an equality constraint, represented by Cx=D, and subject to x≥0.

To calculate the upper bounds of the estimated portions, the probability calculator 206 minimizes $e^T x_i$ of which $e^T$ identifies the combination(s) associated with a particular upper bound and $x_i$ represents a corresponding upper bound value that is to be calculated. For example, $x_1$ represents the upper bound value for the identified combination of activities and characteristics associated with the first estimated portion ($p_1$), $x_2$ represents the upper bound value for the identified combination of activities and characteristics associated with the second estimated portion ($p_2$), $x_3$ represents the upper bound value for the identified combination of activities and characteristics associated with the third estimated portion ($p_3$), etc. The example probability calculator 206 minimizes $e^T x_i$ subject to an equality constraint, represented by −Cx=D, and subject to −x≥0. In the above equations, C represents the example constraint matrix 212, D represents the example combination total set 214, and x represents the lower bound and/or the upper bound to be calculated.

Table 2 provided below includes the portions estimated by the probability calculator 206 and the corresponding lower bounds and upper bounds calculated by the probability calculator 206.

TABLE 2

| Combination | Probability | Lower Bound | Upper Bound |
|---|---|---|---|
| $p_1$ | 0.51% | 0% | 2.02% |
| $p_2$ | 0.13% | 0% | 1.56% |
| $p_3$ | 8.02% | 6.53% | 8.54% |
| $p_4$ | 5.43% | 4.01% | 5.56% |
| $p_5$ | 1.50% | 0% | 2.02% |
| $p_6$ | 1.43% | 0% | 1.56% |
| $p_7$ | 23.45% | 22.93% | 24.95% |
| $p_8$ | 59.52% | 59.39% | 60.95% |

As indicated above in Table 2, the probability calculator 206 provides ranges of portions of the households of the population that match, satisfy and/or belong to combinations of the activities and characteristics of interest. For example, based on Table 2 provided above, the probability calculator 206 estimates that 5.43% of the households of the population have three members but not two televisions in which media is tuned but not presented, and also identifies that between 4.01% and 5.56% of the households of the population must have three members but not two televisions in which media is tuned but not presented. The probability calculator 206 may alternatively calculate lower bounds and/or upper bounds that are not absolute (e.g., relative bounds).

The example query provider 208 of FIG. 2 receives queries that are to be determined based on the portions estimated by the probability calculator 206, the lower bounds calculated by the probability calculator 206 and/or the upper bounds calculated by the probability calculator 206. For example, the query provider 208 receives queries such as the probability that a household tuned to media has three members and two televisions and is presented the media, the probability that a household of tuned and presented media has two televisions, a percent of tuning minutes viewed by households having three members and two televisions, a minimum bound and/or maximum bound for any combination of activities and characteristics, etc.

The example characteristic determiner 210 utilizes the portions, the lower bounds, and/or the upper bounds of the probability calculator 206 to determine audience characteristics 218 related to queries received by the query provider 208. For example, to determine the audience characteristic 218 associated with the probability that a household tuned to media has three members and two televisions and is presented the media, the characteristic determiner 210 divides $p_1$ of Table 1 (e.g., indicating that 0.51% of the households of the population have three members and two televisions in which media is tuned and presented) by the sum of $p_2$ of Table 1 (e.g., indicating that 0.13% of the households of the population have three members and two televisions in which media is tuned but not presented) and $p_1$. In such examples, the characteristic determiner 210 determines the audience characteristic 218 that indicates 79.7% households tuned to media has three members and two televisions and is presented the media. Thus the example audience evaluator 124 utilizes the partial aggregate data 216 to determine the audience characteristics 218 of the population.

While an example manner of implementing the audience evaluator 124 of FIG. 1 is illustrated in FIG. 2, one or more of the elements, processes and/or devices illustrated in FIG. 2 may be combined, divided, re-arranged, omitted, eliminated and/or implemented in any other way. Further, the example constraint constructor 202, the example constraint database 204, the example probability calculator 206, the example query provider 208, the example characteristic determiner 210, and/or, more generally, the example audience evaluator 124 of FIG. 2 may be implemented by hardware, software, firmware and/or any combination of hardware, software and/or firmware. Thus, for example, any of the example constraint constructor 202, the example constraint database 204, the example probability calculator 206, the example query provider 208, the example characteristic determiner 210, and/or, more generally, the example audience evaluator 124 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example constraint constructor 202, the example constraint database 204, the example probability calculator 206, the example query provider 208, the example characteristic determiner 210, and/or the example audience evaluator 124 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience evaluator 124 of FIG. 1 may include one or more elements, processes and/or devices in addition to, or instead of, those illustrated in FIG. 2, and/or may include more than one of any or all of the illustrated elements, processes and devices.

Figure 3:
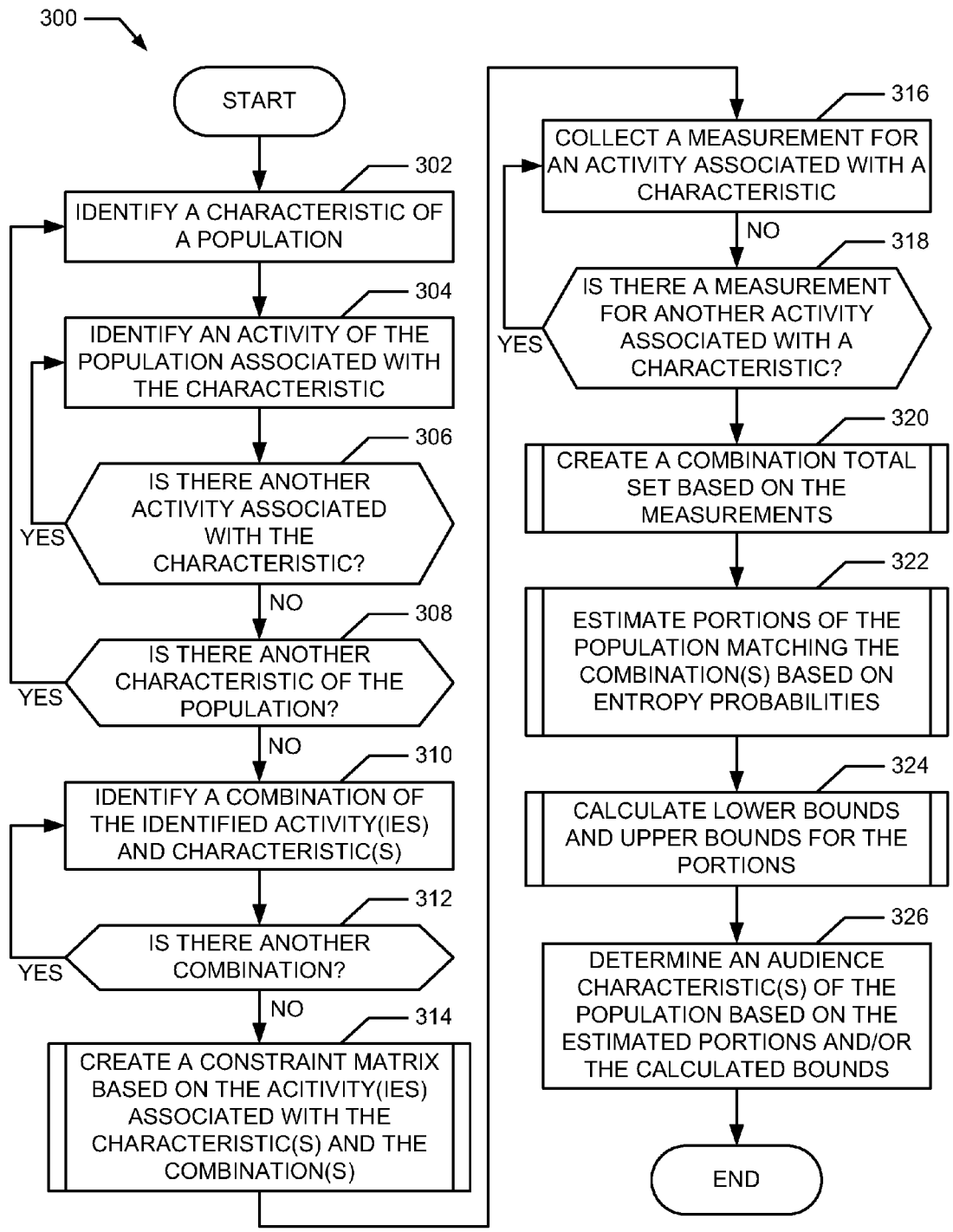
FIG. 3 is a flow diagram representative of example machine readable instructions that may be executed to implement the audience evaluator of FIGS. 1 and/or 2 to determine the characteristic of the media audience of the population.
Figure 4:
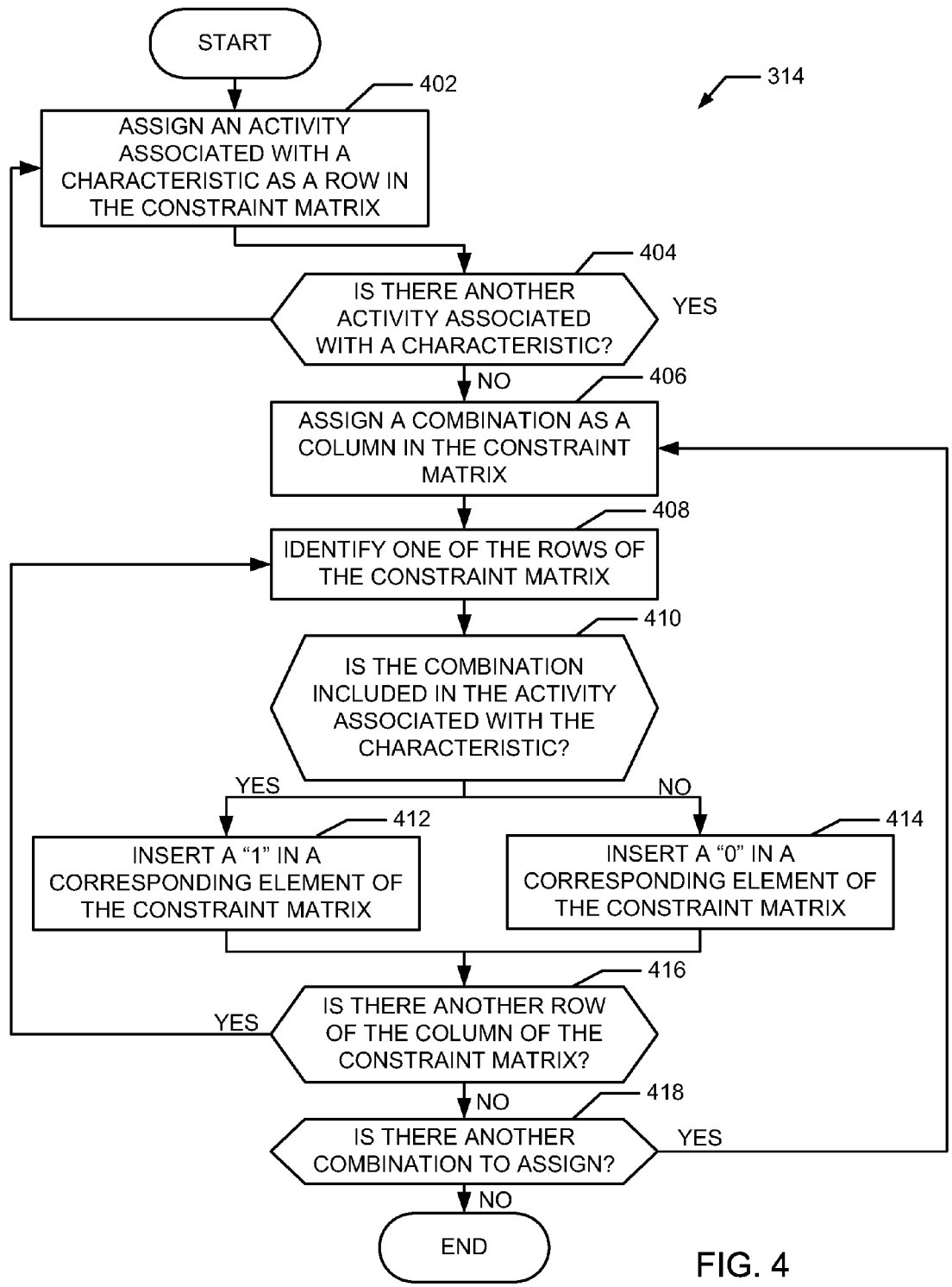
FIG. 4 is a flow diagram representative of example machine readable instructions that may be executed to implement the constraint constructor of FIG. 2 to create a constraint matrix based on the collected partial panelist data of FIG. 1.
Figure 5:
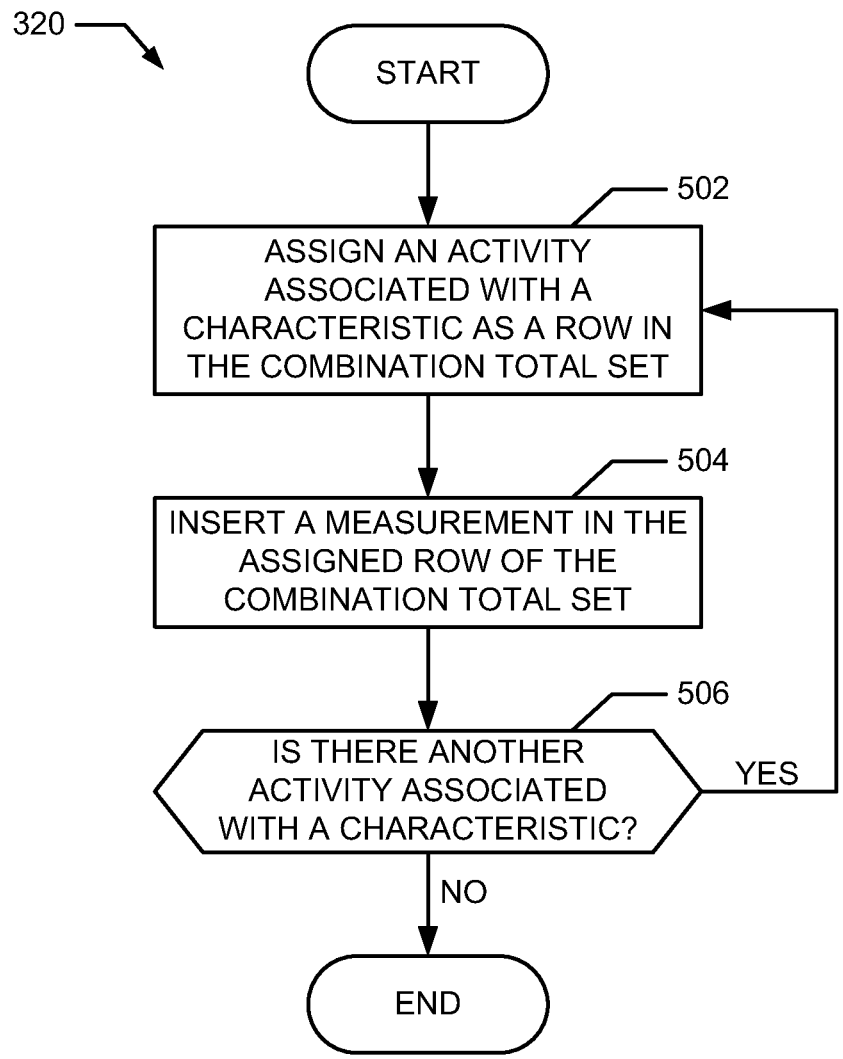
FIG. 5 is a flow diagram representative of example machine readable instructions that may be executed to implement the constraint constructor of FIG. 2 to create a combination total set based on measurements of the collected partial panelist data of FIG. 1.
Figure 6:
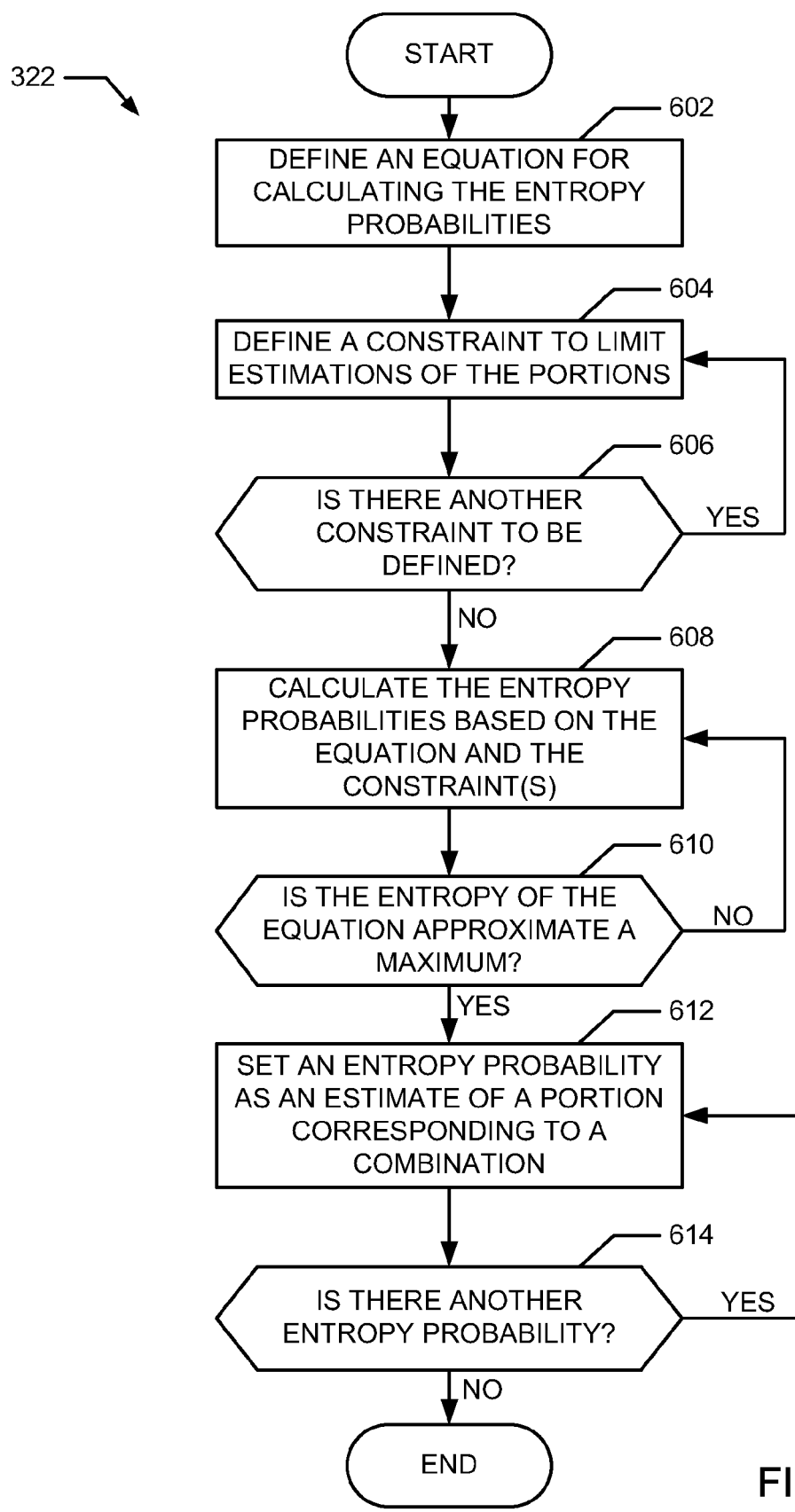
FIG. 6 is a flow diagram representative of example machine readable instructions that may be executed to implement the probability calculator of FIG. 2 to estimate a portion of the population that matches a combination of activity(ies) and characteristic(s) of the collected partial panelist data of FIG. 1.
Figure 7:
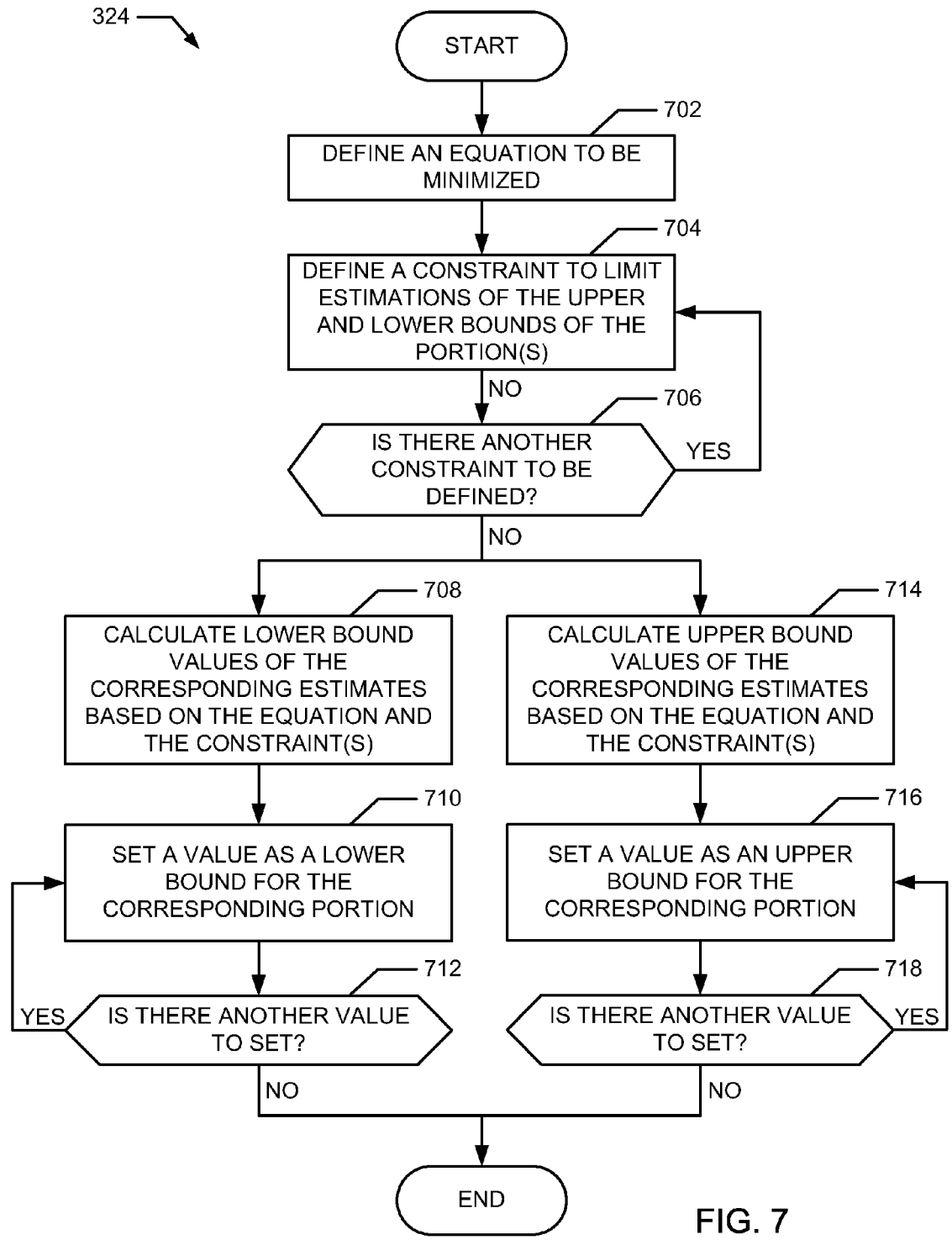
FIG. 7 is a flow diagram representative of example machine readable instructions that may be executed to implement the portion calculator of FIG. 2 to estimate lower bounds and upper bounds of the respective portions of FIG. 6.

A flowchart representative of example machine readable instructions for implementing the audience evaluator 124 of FIG. 1 and/or FIG. 2 is shown in FIG. 3. A flowchart representative of example machine readable instructions for implementing the example constraint constructor 202 of FIG. 2 to construct a constraint matrix is shown in FIG. 4. A flowchart representative of example machine readable instructions for implementing the example constraint constructor 202 of FIG. 2 to construct a combination total set is shown in FIG. 5. A flowchart representative of example machine readable instructions for implementing the example probability calculator 206 of FIG. 2 to estimate portion(s) of a population is shown in FIG. 6. A flowchart representative of example machine readable instructions for implementing the example probability calculator 206 of FIG. 2 to estimate lower bound(s) and upper bound(s) of the estimated portion(s) is shown in FIG. 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3, 4, 5, 6, and/or 7, many other methods of implementing the example audience evaluator 124 may alternatively be used. For example, the order of execution of the blocks may be changed, and/or some of the blocks described may be changed, eliminated, or combined.

As mentioned above, the example processes of FIGS. 3, 4, 5, 6, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the example audience evaluator 124 of FIGS. 1 and/or 2 to determine audience characteristics of a population. Initially, at block 302, the example constraint constructor 202 identifies a characteristic (e.g., a household characteristic) of interest of the population. For example, the constraint constructor 202 identifies the characteristic of households having two three members. At block 304, the example constraint constructor 202 identifies an activity of interest of the population associated with the characteristic identified at block 302. For example, the constraint constructor 202 identifies total tuning minutes (e.g., an activity) for households having three members (e.g., a characteristic).

At block 306, the example constraint constructor 202 identifies whether there is another activity of interest of the population associated with the characteristic identified at block 302. If there is another activity of interest of the population, blocks 304, 306 are repeated until the constraint constructor 202 identifies the other activities associated with the characteristic identified at block 302. For example, blocks 304, 306 are repeated by the constraint constructor 202 to identify other activities associated with households having three members such as total presentation minutes, total exposure minutes, etc.

If there are no other activities associated with the characteristic to be identified, the example constraint constructor 202 determines whether there is another characteristic of interest of the population to be identified (block 308). If there is another characteristic to be identified, blocks 302, 304, 306, 308 are repeated until the characteristics and the activities associated with those characteristics are identified. For example, blocks 302, 304, 306, 308 are repeated by the constraint constructor 202 to identify characteristics such as households having two televisions, all households, etc. and to identify activities associated with those characteristics such as total tuning minutes, total presentation minutes, total exposure minutes, etc. The example constraint constructor 202 identifies the same activities (e.g., total tuning minutes, total presentation minutes, etc.) associated with one characteristic (e.g., households having three members) as the constraint constructor identifies for the other characteristics (e.g., households having two televisions, all households of the population, etc.). Thus, the example constraint constructor 202 repeats blocks 302, 304, 306, 308 to identifies activities associated with characteristics such as total tuning minutes for households having three members, total tuning minutes for households having two televisions, total tuning minutes for all households of the population, total presentation minutes for households having three members, total presentation minutes for households having two televisions, total presentation minutes for all households, etc.

Upon determining that there are no other characteristics of the population to be identified, the example constraint constructor 202 identifies combinations of the identified activity(ies) and characteristic(s) (block 310). For example, if the constraint constructor 202 identifies households having three members and households having two televisions at block 302 and identifies total tuning minutes and total presentation minutes at block 304, the constraint constructor 202 identifies a combination a combination for households having three members and two televisions in which media is tuned and presented as a first column at block 310.

At block 312, the example constraint constructor 202 determines whether there is another combination of the identified activities and characteristics to identify. If there is another combination, blocks 310, 312 are repeated until the constraint constructor 202 identifies the other remaining combinations. For example, blocks 310, 312 are repeated so that the constraint constructor 202 identifies a combination for households having three members and two televisions in which media is tuned but not presented, a combination for households having three members but not two televisions in which media is tuned and presented, a combination for households having three members but not two televisions in which media is tuned but not presented, a combination for households not having three members but having two televisions in which media is tuned and presented, a combination for households not having three members but having two televisions in which media is tuned but not presented, a combination for households not having three members or two televisions in which media is tuned and presented, and a combination for households not having three members or two televisions in which media is tuned but not presented.

Upon determining that there are no other combinations of the identified activities and characteristics, the example constraint constructor 202 creates the example constraint matrix 212 (block 314). For example, the constraint constructor 202 creates the constraint matrix 212 such that the rows represent corresponding activities associated with the characteristics identified at block 302 and the columns represent corresponding combinations of the activities and characteristics identified at block 310. In other examples, the constraint constructor 202 creates the constraint matrix 212 such that the rows represent corresponding combinations of the activities and characteristics and the columns represent corresponding activities associated with the characteristics.

At block 316, the example constraint constructor 202 collects a measurement for a corresponding activity associated with a characteristic identified at block 302 from the constraint database 204. The example constraint constructor 202 collects a measurement of the partial aggregate data 216 that is stored in the example constraint database 204. For example, the partial aggregate data 216 includes aggregate data of the example housing data 120a, 120b, 120c (e.g., tuning data, presentation data, exposure data, characteristics data, etc.) that is collected from the example households 102a, 102b, 102c of the population. For example, at block 316, the constraint constructor 202 collects a measurement of '443,940' from the partial aggregate data 216 of the constraint database 204 for total presentation minutes of households having three members.

At block 318, the example constraint constructor 202 determines whether there is a measurement for another activity associated with a characteristic that was identified at blocks 302. If there are measurements for other identified activities associated with characteristics, blocks 316, 318 are repeated until the constraint constructor 202 collects the other measurements from the partial aggregate data 216 stored in the constraint database 204. For example, blocks 316, 318 are repeated by the constraint constructor 202 to collect a measurement of '104,844' for total presentation minutes of households having two televisions, a measurement of '1,741,474' for total presentation minutes of all households of the population, a measurement of '733,317' for total tuning minutes of households having three members, a measurement of '185,877' for total tuning minutes of households having two televisions, and a measurement of '5,200,347' for total tuning minutes of all households of the population.

The example constraint collector 202 creates the example combination total set 214 based on the collected measurements (block 320). For example, the constraint constructor 202 creates the combination total set 214 such that elements of respective rows of the combination total set 214 represent measurements of corresponding combinations identified at 316. In other examples, the constraint constructor 202 creates the combination total set 214 such that elements of respective columns represent measurements of corresponding combinations.

At block 322, the example probability calculator 206 estimates portions (e.g., percentages) of the population that match the combinations identified at block 310 based on entropy probabilities. For example, the probability calculator 206 performs non-linear optimization to calculate the entropy probabilities using a Jacobian and multivariate Newton's method based on the example constraint matrix 212 created at block 314 and the example combination total set 214 created at block 320.

For example, the probability calculator 206 (1) calculates a portion, $p_1$, for households having three members and two televisions in which media is tuned and presented, (2) calculates a portion, $p_2$, for households having three members and two televisions in which media is tuned but not presented, (3) calculates a portion, $p_3$, for households having three members but not two televisions in which media is tuned and presented, (4) calculates a portion, $p_4$, for households having three members but not two televisions in which media is tuned but not presented, (5) calculates a portion, $p_5$, for households not having three members but having two televisions in which media is tuned and presented, (6) calculates a portion, $p_6$, for households not having three members but having two televisions in which media is tuned but not presented, (7) calculates a portion, $p_7$, for households not having three members or two televisions in which media is tuned and presented, and (8) calculates a portion, $p_8$, for households not having three members or two televisions in which media is tuned but not presented. Example portions calculated by the probability calculator 206 are provided below in Table 3.

TABLE 3

| Combination | Probability |
|---|---|
| $p_1$ | 0.51% |
| $p_2$ | 0.13% |
| $p_3$ | 8.02% |
| $p_4$ | 5.43% |
| $p_5$ | 1.50% |
| $p_6$ | 1.43% |
| $p_7$ | 23.45% |
| $p_8$ | 59.52% |

As indicated above in Table 3, the example probability calculator 206 estimates that 0.51% of the households of the population have three members and two televisions in which media is tuned and presented, 0.13% of the households of the population have three members and two televisions in which media is tuned but not presented, etc.

At block 324, the example probability calculator 206 calculates lower bounds and upper bounds for the combinations identified by the example constraint constructor 202 at block 310. For example, the probability calculator 206 calculates the lower bounds and the upper bounds utilizing a linear programming technique based on the example constraint matrix 212 created at block 314 and the example combination total set 214 created at block 320. The example probability calculator 206 calculates the lower bounds and the upper bounds independently of calculating the portions of the population at block 322. Example lower bounds and upper bounds calculated by the example probability calculator 206 that correspond to the combinations identified by the constraint constructor 202 at block 310 are provided below in Table 4.

TABLE 4

| Combination | Probability | Lower Bound | Upper Bound |
|---|---|---|---|
| $p_1$ | 0.51% | 0% | 2.02% |
| $p_2$ | 0.13% | 0% | 1.56% |
| $p_3$ | 8.02% | 6.53% | 8.54% |
| $p_4$ | 5.43% | 4.01% | 5.56% |
| $p_5$ | 1.50% | 0% | 2.02% |
| $p_6$ | 1.43% | 0% | 1.56% |
| $p_7$ | 23.45% | 22.93% | 24.95% |
| $p_8$ | 59.52% | 59.39% | 60.95% |

As indicated above in Table 4, the example probability calculator 206 calculates the lower bounds and the upper bounds to provide corresponding ranges (e.g., percentages) of portions of the households of the population that match, satisfy and/or belong to combinations of the activities and characteristics identified at block 302. For example, based on row 4 of Table 4 provided above, the probability calculator 206 determines that between 4.01% and 5.56% of the households of the population must have three members but not two televisions and tuned media but not presented media.

At block 326, the example characteristic determiner 210 determines the example audience characteristic(s) 218 based on the portions estimated by the example probability calculator 206 at block 322 and/or based on the lower bounds and upper bounds calculated by the probability calculator at block 324. For example, the characteristic determiner 210 utilizes the estimated portions and/or the calculated lower bounds and upper bounds to determine the audience characteristics 218 that are related to queries received by the example query provider 208. An example query of the query provider 208 relates to the probability that a household tuned to media has three members and two televisions and is presented the media. In such examples, to determine the audience characteristic 218 associated with that probability, the example characteristic determiner 210 divides $p_1$ of Table 3 (e.g., the portion calculated by the probability calculator 206 at block 322 indicating that 0.51% of the households of the population have three members and two televisions in which media is tuned and presented) by the sum of $p_2$ of Table 3 (e.g., the portion calculated by the probability calculator 206 at block 322 indicating that 0.13% of the households of the population have three members and two televisions in which media is tuned but not presented) and $p_1$. In such examples, the characteristic determiner 210 determines the audience characteristic 218 that indicates 79.7% households tuned to media has three members and two televisions and is presented the media.

FIG. 4 is a flow diagram representative of the example machine readable instructions 314 that may be executed to implement the example constraint constructor 202 of FIG. 2 to create the example constraint matrix 212. For example, the instructions 314 illustrated by the flow diagram of FIG. 4 may implement block 314 of FIG. 3. Initially, at block 402, the example constraint constructor 202 assigns an activity associated with a characteristic as a row in the example constraint matrix 212. The example constraint constructor 202 assigns an activity associated with a characteristic that was identified by the constraint constructor at block 302 of FIG. 3 as a row in the constraint matrix 212. For example, the constraint constructor 202 assigns the total tuning minutes (the activity) associated with households having three members (the characteristic) as a first row in the example constraint matrix 212.

At block 404, the example constraint constructor 202 determines whether there is another activity associated with a characteristic. For example, the constraint constructor 202 determines whether there is another activity associated with a characteristic that was identified at block 302 of FIG. 3. If there is another activity associated with a characteristic, blocks 402, 404 are repeated by the constraint constructor 202 until the other activities associated with characteristics are assigned corresponding rows of the constraint matrix 212. For example, blocks 402, 404 are repeated so that the constraint constructor 202 assigns the total presentation minutes for households having two televisions as a second row, assigns the total presentation minutes as a third row, assigns the total tuning minutes for households having three members as a fourth row, assigns the total tuning minutes for households having two televisions as a fifth row, and assigns the total tuning minutes as a sixth row.

At block 406, the example constraint constructor 202 assigns a combination of identified activities and characteristics as a column in the constraint matrix 212. For example, the constraint constructor 202 assigns a combination identified by the constraint constructor 202 at block 310 of FIG. 3 as a column in the constraint matrix 212. As an example, the constraint constructor 202 assigns the combination for households having three members and two televisions in which media is tuned and presented as a first column in the example constraint matrix 212.

At block 408, the example constraint constructor 202 identifies one of the rows of the constraint matrix 212. For example, the constraint constructor 202 identifies the first row of the example constraint matrix that is associated with total tuning minutes for households having three members. At block 410, the example constraint constructor 202 determines whether the combination assigned to the column at block 406 is included in the activity associated with the characteristic that is assigned at block 402. For example, the constraint constructor 202 determines whether the combination for households having three members and two televisions in which media is tuned and presented is included in the total tuning minutes for households having three members. If the combination is included in the activity associated with the characteristic, the example constraint constructor 202 inserts a '1' in a corresponding element of the constraint matrix 212 (block 412). If the combination is not included in the activity associated with the characteristic, the example constraint constructor 202 inserts a '0' in the corresponding element of the constraint matrix 212 (block 414). For example, because the combination for households having three members and two televisions in which media is tuned and presented is included in the total tuning minutes for households having three members, the constraint constructor 202 inserts a '1' in the corresponding element (e.g., the element at the first row and the first column of the constraint matrix 212).

At block 416, the example constraint constructor 202 determines whether there is another row of the column of the example constraint matrix 212 that was assigned at block 406. If there is another row, blocks 408, 410, 412, 414, 416 are repeated until the constraint constructor 202 assigns a '1' or '0' into the remaining elements of the assigned column. For example, the constraint constructor 202 repeats blocks 408, 410, 412, 414, 416 to insert a '1' in the element of the second row of the first column, a '1' in the element of the third row of the first column, a '1' in the element of the fourth row of the first column, a '1' in the element of the fifth row of the first column, and a '1' in the element of the sixth row of the first column.

At block 418, the example constraint constructor 202 determines if there is another combination to assign as a column in the constraint matrix 212. For example, the constraint constructor 202 determines whether there is another combination of activities and characteristics identified at block 310 of FIG. 3 to assign as another column in the example constraint matrix 212. If there are other combinations of activities and characteristics, blocks 406, 408, 410, 412, 414, 416, 418 are repeated until the constraint constructor 202 inserts a '1' or a '0' in the elements of the constraint matrix 212 for the other combinations (e.g., total presentation minutes for households having two televisions, total presentation minutes, total tuning minutes for households having three members, total tuning minutes for households having two televisions, and total tuning minutes) identified by the constraint constructor 202 at block 310 of FIG. 3. For example, the constraint constructor 202 assigns the combination for households having three members and two televisions in which media is tuned but not presented as the second column of the example constraint matrix (block 406). Further, the example constraint constructor 202 inserts a '0' in the element of the first row of the second column, a '0' in the element of the second row of the second column, a '0' in the element of the third row of the second column, a '1' in the element of the fourth row of the second column, a '1' in the element of the fifth row of the second column, and a '1' in the element of the sixth row of the second column (blocks 408, 410, 412, 414).

FIG. 5 is a flow diagram representative of the example machine readable instructions 320 that may be executed to implement the example constraint constructor 202 of FIG. 2 to create the example combination total set 214. For example, the instructions 320 illustrated by the flow diagram of FIG. 5 may implement block 320 of FIG. 3. Initially, at block 502, the example constraint constructor 202 assigns an activity associated with a characteristic as a row in the example constraint matrix 212. For example, the constraint constructor 202 assigns an activity associated with a characteristic that was identified by the constraint constructor 202 at block 302 of FIG. 3 as a row in the combination total set 214. The example constraint constructor 202 assigns the same activity associated with the characteristic as a first row of the combination total set 214 as the constraint constructor 202 assigns as the first row of the constraint matrix 212 at block 402 of FIG. 4. For example, the constraint constructor 202 assigns the total tuning minutes (the activity) associated with households having three members (the characteristic) as the first row in the example constraint matrix 212.

At block 504, the constraint constructor 202 inserts a measurement of the assigned activity associated with the characteristic into an element of the corresponding assigned row of the example combination total set 214. For example, the constraint constructor 202 inserts a measurement of '443,940' (e.g., the measurement for the total tuning minutes of households having three members that was collected by the constraint constructor 202 at block 316 of FIG. 3) in the element of the first row of the combination total set 214.

At block 506, the example constraint constructor 202 determines whether there is another activity associated with a characteristic. For example, the constraint constructor 202 determines whether there is another activity associated with a characteristic that was identified at block 302 of FIG. 3. If there is another activity associated with a characteristic, blocks 502, 504, 506 are repeated by the constraint constructor 202 until the other activities associated with characteristics are assigned corresponding elements of rows of the combination total set 214. For example, blocks 502, 504, 506 are repeated by the constraint constructor 202 to assign the measurement of '104,844' as an element of the second row of the combination total set 214, the measurement of '1,741,474' as an element of the third row, the measurement of '733,317' as an element of the fourth row, the measurement of '185,877' as an element of the fifth row, and the measurement of '5,200,347' as an element of the sixth row.

FIG. 6 is a flow diagram representative of the example machine readable instructions 322 that may be executed to implement the example probability calculator 206 of FIG. 2 to estimate portions (e.g., percentages) of the population matching corresponding combinations of activities and characteristics of interest. For example, the instructions 322 illustrated by the flow diagram of FIG. 6 may implement block 322 of FIG. 3. Initially, at block 602, the example probability calculator 206 defines an equation for calculating entropy probabilities to estimate the portions of the population. The example probability calculator 206 is to define Equation 2 provided below.

$$-\sum_{i=1}^{n} p_i \log p_i \quad \text{Equation 2}$$

In Equation 2 provided above, p represents probabilities that are to be calculated to estimate the portions of the population. For example, p of Equation 2 includes probabilities $p_1$, $p_2$, $p_3$, $p_4$, $p_5$, $p_6$, $p_7$, $p_8$.

At block 604, the example probability calculator 206 is to define a constraint to limit the estimations of the portions. For example, the probability calculator 206 defines a constraint that p be non-negative, represented by p≥0, to limit the probabilities of p to non-negative values. At block 606, the example probability calculator 206 determines whether there is another constraint to be defined. If there is another constraint, the probability calculator 206 repeats blocks 604, 606 until the remaining constraint are defined. For example, the probability calculator 206 repeats block 604 to define an equality constraint, represented by Cp=D, in which C represents the example constraint matrix 212 and D represents the example combination total set 214.

At block 608, the probability calculator 206 calculates the entropy probabilities based on the equation defined at block 602 and the constraints defined at block 604. For example, to calculate the entropy probabilities, the probability calculator 206 calculates the probabilities, p, of the equation defined at block 602 subject to the constraint that the probabilities be non-negative, p≥0, and subject to the equality constraint, Cp=D, defined at block 604. Because C represents the example constraint matrix 212 and D represents the example combination total set 214, the example probability calculator 206 calculates the entropy probabilities based on the example constraint matrix 212 and the example combination total set 214. For example, the probability calculator 206 calculates an initial set of entropy probabilities based on an initial estimate of the probabilities.

At block 610, the example probability calculator 206 determines whether the entropy of the equation defined at block 602 (e.g., Equation 2) is approximate a maximum based on the entropy probabilities calculated at block 608. If the entropy is not approximate to the maximum, the probability calculator 206 repeats blocks 608, 610 until the entropy of the defined equation approximates the maximum. For example, the example probability calculator 206 approximates the maximum of the above-provided Equation 2 defined at block 602 to calculate the entropy probabilities $p_1$, $p_2$, $p_3$, $p_4$, $p_5$, $p_6$, $p_7$, $p_8$ that correspond to the rows of the example constraint matrix 212 and the example combination total set 214 (e.g., $p_1$ corresponds to the first rows of the constraint matrix 212 and the combination total set 214, $p_2$ corresponds to the second rows of the constraint matrix 212 and the combination total set 214, etc.).

If the entropy of the equation defined at block 602 does not approximate the maximum, the example probability calculator 206 repeats blocks 608, 610 until the entropy approximates the maximum. For example, the probability calculator 206 calculates the entropy probabilities at blocks 608, 610 by performing non-linear optimization of the defined equation using a Jacobian and multivariate Newton's method. For example, the probability calculator 206 calculates the entropy probabilities at blocks 608, 610 as provided in Table 5 below.

TABLE 5

| Combination | Probability |
| --- | --- |
| $p_1$ | 0.51% |
| $p_2$ | 0.13% |
| $p_3$ | 8.02% |
| $p_4$ | 5.43% |

TABLE 5-continued

| Combination | Probability |
| --- | --- |
| $p_5$ | 1.50% |
| $p_6$ | 1.43% |
| $p_7$ | 23.45% |
| $p_8$ | 59.52% |

At block 612, the example probability calculator 206 sets an entropy probability as an estimate of a portion corresponding to a combination of activities and characteristics that was assigned to rows of the of example constraint matrix 212 and the example combination total set 214 (e.g., a combination of activities and characteristics that was identified at block 310 of FIG. 3). For example, the probability calculator 206 sets the entropy probability $p_1$ (e.g., 0.51% in Table 5) as a portion of the households of the population that have three members and two televisions in which media is tuned and presented.

At block 614, the example probability calculator 206 determines whether there is another entropy probability to set as an estimate of a portion of the population. If there are other entropy probabilities, the probability calculator 206 repeats blocks 612, 614 until the other entropy probabilities are set as estimates of corresponding portions. For example, the probability calculator 206 repeats blocks 612, 614 to set the example entropy probabilities $p_2$, $p_3$, $p_4$, $p_5$, $p_6$, $p_7$, $p_8$ as estimates of corresponding portions associated with the identified combinations of activities and characteristics.

FIG. 7 is a flow diagram representative of the example machine readable instructions 324 that may be executed to implement the example probability calculator 206 of FIG. 2 to estimate lower bounds and upper bounds for the estimated portions of the population. For example, the instructions 324 illustrated by the flow diagram of FIG. 7 may implement block 324 of FIG. 3. Initially, at block 702, the example probability calculator 206 defines an equation to be minimized to calculate the respective lower bounds and upper bounds. For example, the probability calculator 206 defines $e^T x_i$ to be minimized to calculate the lower bounds and the upper bounds.

At block 704, the example probability calculator 206 defines a constraint for the calculations of the lower bounds and upper bounds. For example, the probability calculator 206 defines a constraint that the lower bounds be non-negative, represented by x≥0. At block 706, the example probability calculator 206 determines whether there is another constraint to be defined. If there is another constraint, the probability calculator 206 repeats blocks 704, 706 until the remaining constraint are defined. For example, the probability calculator 206 repeats blocks 704, 706 to define an equality constraint, represented by Cx=D (e.g., in which C represents the example constraint matrix 212 and D represents the example combination total set 214), to limit the lower bound calculations. Further, the example probability calculator 206 repeats blocks 704, 706 to define a constraint that the upper bounds be non-negative that is represented by −x≥0 and an equality constraint for the upper bounds that is represented by —Cx=D (e.g., in which C represents the example constraint matrix 212 and D represents the example combination total set 214).

At block 708, upon identifying the constraints, the example probability calculator 206 calculates lower bound values of the corresponding estimates based on the equation defined at block 702 and the lower bound constraint(s) defined at block 704. For example, to calculate the lower bounds, the probability calculator 206 minimizes x of equation $e^T x_i$ subject to the constraint that the lower bound be non-negative, represented by x≥0, and the equality constraint, represented by Cx=D. Because C represents the example constraint matrix 212 and D represents the example combination total set 214, the example probability calculator 206 calculates the lower bounds based on the example constraint matrix 212 and the example combination total set 214. The example probability calculator 206 minimizes x by minimizing a sum of elements of x (e.g., $x_1$, $x_2$, $x_3$, $x_4$, $x_5$, $x_6$, $x_7$, $x_8$) that correspond to the rows of the example constraint matrix 212 and the example combination total set 214 (e.g., $x_1$ corresponds to the first rows of the constraint matrix 212 and the combination total set 214, $x_2$ corresponds to the second rows of the constraint matrix 212 and the combination total set 214, etc.). For example, the probability calculator 206 calculates the lower bounds as provided in Table 6 below.

TABLE 6

| Combination | Lower Bound |
| --- | --- |
| $x_1$ | 0% |
| $x_2$ | 0% |
| $x_3$ | 6.53% |
| $x_4$ | 4.01% |
| $x_5$ | 0% |
| $x_6$ | 0% |
| $x_7$ | 22.93% |
| $x_8$ | 59.39% |

At block 710, the example probability calculator 206 sets a lower bound value of x as a lower bound of a corresponding portion estimated at block 322 of FIG. 3 and/or the machine readable instructions 322 of FIG. 3. For example, the probability calculator 206 sets a lower bound of $x_1$ as a lower bound of the portion associated $p_1$. Thus, the example probability calculator 206 sets a lower bound of 0% for households of the population having three members and two televisions in which media is tuned and presented. At block 712, the example probability calculator 206 determines whether there is another lower bound value to set as a lower bound of a corresponding portion of the population. If there are other lower bounds to set, the probability calculator 206 repeats blocks 710, 712 until the other calculated lower bound values are set as lower bounds of the corresponding portions of the population. For example, the probability calculator repeats blocks 710, 712 to set the lower bound values $x_2$, $x_3$, $x_4$, $x_5$, $x_6$, $x_7$, $x_8$ as lower bounds for the corresponding portions of the population.

At block 714, the example probability calculator 206 calculates upper bound values of the corresponding estimates based on the equation defined at block 702 and the upper bound constraint defined at block 704. For example, to calculate the upper bounds, the probability calculator 206 minimizes x of equation $e^T x_i$ subject to the constraint that the upper bound be non-negative, represented by −x≥0, and the equality constraint, represented by −Cx=D. Because C represents the example constraint matrix 212 and D represents the example combination total set 214, the example probability calculator 206 calculates the upper bounds based on the example constraint matrix 212 and the example combination total set 214. The example probability calculator 206 minimizes x by minimizing a sum of elements of x (e.g., $x_1$, $x_2$, $x_3$, $x_4$, $x_5$, $x_6$, $x_7$, $x_8$) that correspond to the rows of the example constraint matrix 212 and the example combination total set 214 For example, the probability calculator 206 calculates the upper bounds as provided in Table 7 below.

TABLE 7

| Combination | Upper Bound |
|---|---|
| $x_1$ | 2.02% |
| $x_2$ | 1.56% |
| $x_3$ | 8.54% |
| $x_4$ | 5.56% |
| $x_5$ | 2.02% |
| $x_6$ | 1.56% |
| $x_7$ | 24.95% |
| $x_8$ | 60.95% |

At block 716, the example probability calculator 206 sets an upper bound value of x as an upper bound of a corresponding portion estimated at block 322 of FIG. 3 and/or the machine readable instructions 322 of FIG. 3. For example, the probability calculator 206 sets an upper bound of $x_1$ as an upper bound of the portion associated $p_1$. Thus, the example probability calculator 206 sets an upper bound of 2.02% for households of the population having three members and two televisions in which media is tuned and presented. At block 718, the example probability calculator 206 determines whether there is another upper bound value to set as an upper bound of a corresponding portion of the population. If there are other upper bounds to set, the probability calculator 206 repeats blocks 716, 718 until the other calculated upper bound values are set as upper bounds of the corresponding portions of the population. For example, the probability calculator repeats blocks 716, 718 to set the upper bound values $x_2$, $x_3$, $x_4$, $x_5$, $x_6$, $x_7$, $x_8$ as upper bounds for the corresponding portions of the population.

Figure 8:
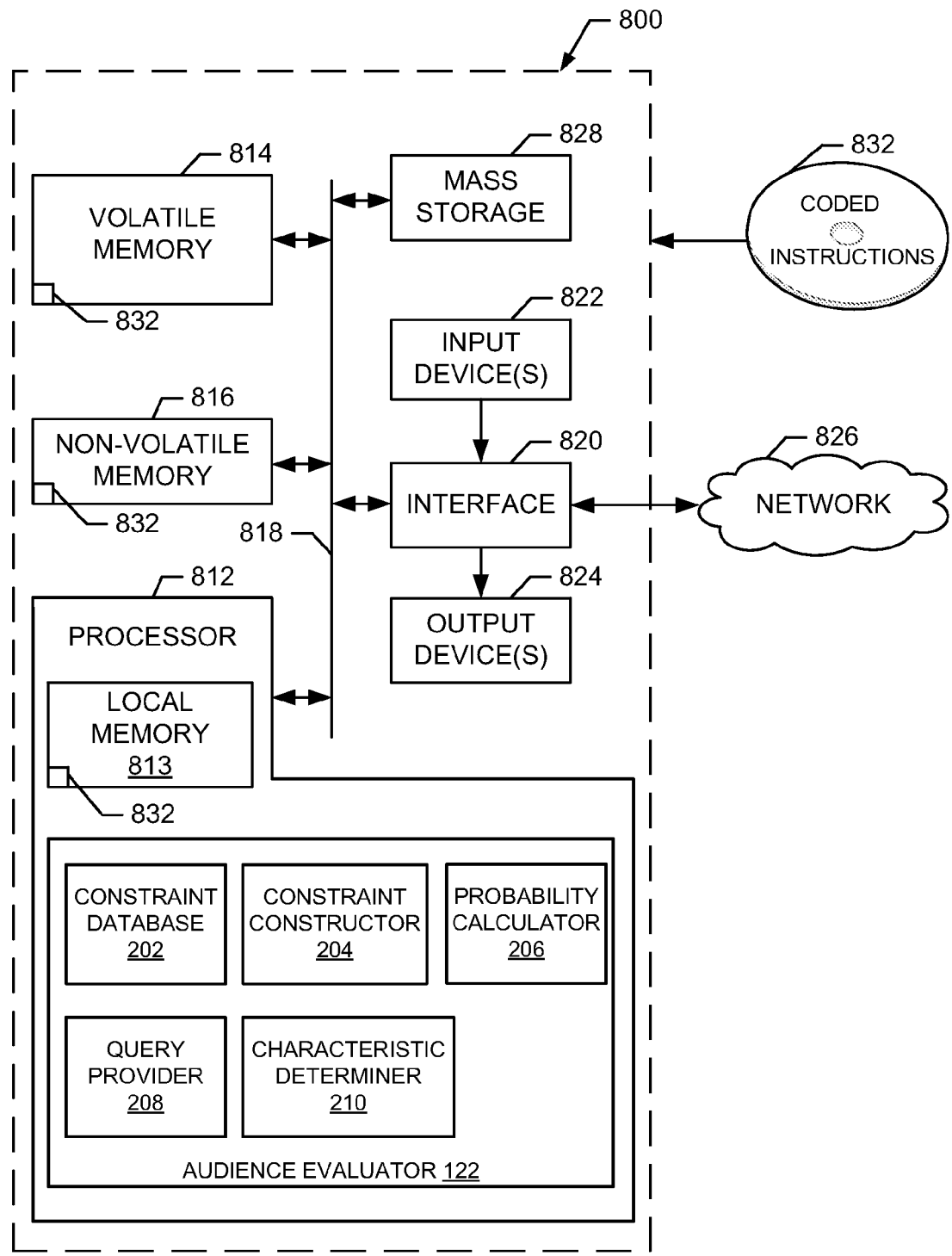
FIG. 8 is a block diagram of an example processor system structured to execute the example machine readable instructions represented by FIGS. 3, 4, 5, 6 and/or 7 to implement the audience evaluator of FIGS. 1 and/or 2.

FIG. 8 is a block diagram of an example processor platform 800 structured to execute the instructions of FIGS. 3, 4, 5, 6, and/or 7 to implement the audience evaluator of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The processor 812 of the illustrated example includes the example constraint constructor 202, the example constraint database 204, the example probability calculator 206, the query provider 208, the example characteristic determiner 210, and/or, more generally, the audience evaluator 124.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 of FIGS. 3, 4, 5, 6, and/or 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable an audience measurement entity to accurately estimate portions of a population that match audience characteristics of interest by calculating entropy probabilities based on partial aggregate data of the population. Some of the disclosed methods, apparatus and articles of manufacture reduce processing resource utilization by computing an estimate for portions of the population without consuming computer memory and computer processing resources to calculate individual-level weights for the members of the sub-population.

Furthermore, in some examples, audience data collected by computerized metering devices is delivered to an audience measurement entity via computer networks. In some such examples, the audience measurement data from the computerized metering devices do not identify measurements for combinations of audience characteristics in the same manner as non-computerized audience measurement (e.g., surveying, self-reporting, notebook logs, etc.). Accordingly, in such examples, disclosed methods, apparatus, and articles of manufacture determine the combinations of audience characteristics to solve a problem specific to computer systems and/or computer networks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine characteristics of media audiences, the method comprising:
    creating, by executing an instruction via a processor, a constraint matrix in computer memory based on a first activity being associated with a first characteristic of a population, the first activity being associated with a second characteristic of the population, and a first combination being associated with at least one of the first activity, the first characteristic, and the second characteristic;
    creating, by executing an instruction via the processor, a combination total set in the computer memory based on a first measurement for the first activity being associated with the first characteristic and a second measurement for the first activity being associated with the second characteristic;
    computing, by executing an instruction via the processor, a first entropy probability based on an equality constraint including the constraint matrix and the combination total set; and
    reducing an amount of data collected by the processor by estimating, by executing an instruction via the processor, a first portion of the population that matches the first combination based on the first entropy probability.

2. The method as defined in claim 1, wherein the creating of the constraint matrix is further based on the first activity being associated with a third characteristic of the population.

3. The method as defined in claim 1, wherein the creating of the constraint matrix is further based on a second activity being associated with the first characteristic and the second activity being associated with the second characteristic.

4. The method as defined in claim 1, wherein the creating of the constraint matrix is further based on a second combination being associated with at least one of the first activity, the first characteristic, and the second characteristic, the second combination being different than the first combination.

5. The method as defined in claim 1, wherein the creating of the constraint matrix includes assigning the first activity being associated with the first characteristic as a first row of the constraint matrix, assigning the first activity being associated with the second characteristic as a second row of the constraint matrix, and assigning the first combination as a column of the constraint matrix.

6. The method as defined in claim 1, wherein the calculating of the first entropy probability includes performing non-linear optimization of the constraint matrix and the combination total set using a Jacobian and multivariate Newton's method.

7. The method as defined in claim 1, wherein the computing of the first entropy probability includes approximating a first maximum entropy probability.

8. The method as defined in claim 1, further including identifying an audience characteristic of the population by utilizing the first portion of the population as partial panelist data to determine the audience characteristic.

9. The method as defined in claim 1, wherein the processor includes at least a first processor of a first hardware computer system and a second processor of a second hardware computer system.

10. The method as defined in claim 1, further including:
    identifying the first characteristic;
    identifying the second characteristic; and
    identifying an association between the first activity and the first characteristic and an association between the first activity and the second characteristic.

11. The method as defined in claim 1, further including:
    collecting the first measurement for the first activity being associated with the first characteristic; and
    collecting the second measurement for the first activity being associated with the second characteristic.

12. The method as defined in claim 1, further including calculating a lower bound of the first portion and an upper bound of the first portion.

13. The method as defined in claim 1, further including determining an audience characteristic of the population based on the first portion.

14. The method as defined in claim 1, wherein the first characteristic and the second characteristic include at least one of panelist households having a first quantity of members, panelist households having a second quantity of television sets, and all panelist households.

15. The method as defined in claim 1, wherein the first activity includes total tuning minutes or total presentation minutes.

16. The method of claim 4, further including:
    computing, by executing an instruction via the processor, a second entropy probability based on the constraint matrix and the combination total set; and
    estimating, by executing an instruction via the processor, a second portion of the population that matches the second combination based on the second entropy probability.

17. An apparatus to determine characteristics of media audiences, the apparatus comprising:
    a constraint constructor to:
        create a constraint matrix in computer memory based on a first activity being associated with a first characteristic of a population, the first activity being associated with a second characteristic of the population, and a first combination being associated with at least one of the first activity, the first characteristic, and the second characteristic; and
        create a combination total set in the computer memory based on a first measurement for the first activity being associated with the first characteristic and a second measurement being associated with the second characteristic; and
    a probability calculator to:
        compute a first entropy probability based on an equality constraint including the constraint matrix and the combination total set; and
        reduce an amount of data collected by the constraint constructor by estimating a first portion of the population that matches the first combination based on the first entropy probability.

18. The apparatus as defined in claim 17, wherein the probability calculator is to calculate a lower bound of the first portion and an upper bound of the first portion.

19. The apparatus as defined in claim 17, further including a characteristic determiner to determine an audience characteristic of the population based on the first portion.

20. The apparatus as defined in claim 17, wherein the first characteristic and the second characteristic include at least one of panelist households having a first quantity of members, panelist households having a second quantity of television sets, and all panelist households.

21. The apparatus as defined in claim 17, wherein the first activity includes total tuning minutes or total presentation minutes.

22. The apparatus as defined in claim 17, wherein, to create the constraint matrix, the constraint constructor is to:
   assign the first activity being associated with the first characteristic as a first row of the constraint matrix;
   assign the first activity being associated with the second characteristic as a second row of the constraint matrix; and
   assign the first combination as a column of the constraint matrix.

23. The apparatus as defined in claim 17, wherein, to calculate the first entropy probability, the probability calculator is to perform non-linear optimization of the constraint matrix and the combination total set using a Jacobian and multivariate Newton's method.

24. The apparatus as defined in claim 17, wherein the constraint constructor is to create the constraint matrix further based on the first activity being associated with a third characteristic of the population.

25. The apparatus as defined in claim 17, wherein the constraint constructor is to create the constraint matrix further based on a second activity being associated with the first characteristic and the second activity being associated with the second characteristic.

26. The apparatus as defined in claim 17, wherein the constraint constructor is to create the constraint matrix further based on a second combination being associated with at least one of the first activity, the first characteristic, and the second characteristic, the second combination being different than the first combination.

27. The apparatus as defined in claim 17, wherein, to compute the first entropy probability, the probability calculator is to approximate a first maximum entropy probability.

28. The apparatus as defined in claim 17, wherein the probability calculator is to estimate an audience characteristic of the population by utilizing the first portion of the population as partial panelist data to determine the audience characteristic.

29. The apparatus as defined in claim 17, wherein the constraint constructor is to:
   identify the first characteristic;
   identify the second characteristic; and
   identify an association between the first activity and the first characteristic and an association between the first activity and the second characteristic.

30. The apparatus as defined in claim 17, wherein the constraint constructor is to:
   collect the first measurement for the first activity being associated with the first characteristic; and
   collect the second measurement for the first activity being associated with the second characteristic.

31. The apparatus of claim 26, wherein the probability calculator further is to:
   compute a second entropy probability based on the constraint matrix and the combination total set; and
   estimate a second portion of the population that matches the second combination based on the second entropy probability.

32. A tangible computer readable storage medium to determine characteristics of media audiences, the tangible computer readable storage medium comprising instructions which, when executed, cause a machine to at least:
   create a constraint matrix in computer memory based on a first activity being associated with a first audience characteristic of a population, the first activity being associated with a second audience characteristic of the population, and a first combination being associated with at least one of the first activity, the first characteristic, and the second characteristic;
   create a combination total set in the computer memory based on a first measurement for the first activity being associated with the first characteristic and a second measurement for the first activity being associated with the second characteristic;
   compute a first entropy probability based on an equality constraint including the constraint matrix and the combination total set; and
   reduce an amount of data collected by a processor by estimating a first portion of the population that matches the first combination based on the first entropy probability.

33. The tangible computer readable storage medium as defined in claim 32, wherein the instructions cause the machine to create the constraint matrix is further based on the first activity being associated with a third characteristic of the population.

34. The tangible computer readable storage medium as defined in claim 32, wherein the instructions cause the machine to create the constraint matrix further based on a second activity being associated with the first characteristic and the second activity being associated with the second characteristic.

35. The tangible computer readable storage medium as defined in claim 32, wherein the instructions cause the machine to create the constraint matrix further based on a second combination being associated with at least one of the first activity, the first characteristic, and the second characteristic, the second combination being different than the first combination.

36. The tangible computer readable storage medium as defined in claim 32, wherein the instructions cause the machine to compute the first entropy probability by approximating a first maximum entropy probability.

37. The tangible computer readable storage medium as defined in claim 32, wherein the instructions cause the machine to estimate an audience characteristic of the population by utilizing the first portion of the population as partial panelist data to determine the audience characteristic.

38. The tangible computer readable storage medium as defined in claim 32, wherein the instructions cause the machine to calculate a lower bound of the first portion and an upper bound of the first portion.

39. The tangible computer readable storage medium as defined in claim 32, wherein the instructions cause the machine to determine an audience characteristic of the population based on the first portion.

40. The tangible computer readable storage medium as defined in claim 32, wherein the first characteristic and the second characteristic include at least one of panelist households having a first quantity of members, panelist households having a second quantity of television sets, and all panelist households.

41. The tangible computer readable storage medium as defined in claim 32, wherein the first activity includes total tuning minutes or total presentation minutes.

42. The tangible computer readable storage medium as defined in claim 32, wherein the instructions cause the machine to create the constraint matrix by:
assigning the first activity being associated with the first characteristic as a first row of the constraint matrix;
assigning the first activity being associated with the second characteristic as a second row of the constraint matrix; and
assigning the first combination as a column of the constraint matrix.

43. The tangible computer readable storage medium as defined in claim 32, wherein the instructions cause the machine to calculate the first entropy probability by performing non-linear optimization of the constraint matrix and the combination total set using a Jacobian and multivariate Newton's method.

44. The tangible computer readable storage medium as defined in claim 32, wherein the instructions cause the machine to:
identify the first characteristic;
identify the second characteristic; and
identify an association between the first activity and the first characteristic and an association between the first activity and the second characteristic.

45. The tangible computer readable storage medium as defined in claim 32, wherein the instructions cause the machine:
collect the first measurement for the first activity being associated with the first characteristic; and
collect the second measurement for the first activity being associated with the second characteristic.

46. The tangible computer readable storage medium of claim 25, wherein the instructions cause the machine to:
compute a second entropy probability based on the constraint matrix and the combination total set; and
estimate a second portion of the population that matches the second combination based on the second entropy probability.

* * * * *